United States Patent
Liu et al.

(10) Patent No.: US 11,012,922 B2
(45) Date of Patent: May 18, 2021

(54) COMMON SEARCH SPACE DESIGN FOR COVERAGE ENHANCEMENT IN WIRELESS COMMUNICATIONS

(71) Applicant: QUALCOMM Incorporated, San Diego, CA (US)

(72) Inventors: Chih-Hao Liu, San Diego, CA (US); Srinivas Yerramalli, San Diego, CA (US); Tamer Kadous, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 181 days.

(21) Appl. No.: 16/040,098

(22) Filed: Jul. 19, 2018

(65) Prior Publication Data

US 2019/0090178 A1   Mar. 21, 2019

Related U.S. Application Data

(60) Provisional application No. 62/560,092, filed on Sep. 18, 2017.

(51) Int. Cl.
*H04W 48/12* (2009.01)
*H04W 48/16* (2009.01)
(Continued)

(52) U.S. Cl.
CPC ........... *H04W 48/12* (2013.01); *H04L 5/0053* (2013.01); *H04L 5/0094* (2013.01); *H04W 48/16* (2013.01);
(Continued)

(58) Field of Classification Search
CPC ... H04W 48/16; H04W 52/58; H04W 72/042; H04W 72/1289; H04W 74/0833;
(Continued)

(56) References Cited

U.S. PATENT DOCUMENTS

2012/0127946 A1* 5/2012 Nishio ................ H04L 1/0038
370/329
2013/0058294 A1* 3/2013 Miki ..................... H04L 5/0007
370/329
(Continued)

FOREIGN PATENT DOCUMENTS

| EP | 2590350 A1 | 5/2013 |
|---|---|---|
| WO | WO-2016149040 A1 | 9/2016 |
| WO | WO-2017100355 A1 | 6/2017 |

OTHER PUBLICATIONS

International Search Report and Written Opinion—PCT/US2018/043103—ISA/EPO—dated Oct. 29, 2018 (176471WO).
(Continued)

*Primary Examiner* — Brian P Cox
(74) *Attorney, Agent, or Firm* — Holland & Hart LLP

(57) ABSTRACT

Methods, systems, and devices for wireless communications are described. A base station and user equipment (UE) may utilize an enhanced physical downlink control channel (ePDCCH) within a common search space to establish a MulteFire connection. The common search space may include a common PDCCH (C-PDCCH) and a MulteFire system information block (SIB-MF1) grant. The base station may define one or more common search spaces for the SIB-MF1 grants and C-PDCCH and signal the resource allocation for the common search spaces to the UE within a master information block (MIB). Each common search space may include a fixed set of control elements that the UE monitors for decoding the SIB-MF1 grants and C-PDCCH. In some cases, the base station may hardcode resources for the SIB-MF1 grants and C-PDCCH. Alternatively, the base station may signal the resources for each of the SIB-MF1 grants and C-PDCCH via reserved bits in the MIB.

44 Claims, 15 Drawing Sheets

(51) Int. Cl.
| | |
|---|---|
| *H04L 5/00* | (2006.01) |
| *H04W 52/58* | (2009.01) |
| *H04W 74/08* | (2009.01) |
| *H04W 72/12* | (2009.01) |
| *H04L 27/26* | (2006.01) |
| *H04W 72/04* | (2009.01) |

(52) U.S. Cl.
CPC ....... *H04W 52/58* (2013.01); *H04W 74/0833* (2013.01); *H04L 5/001* (2013.01); *H04L 5/0007* (2013.01); *H04L 5/0051* (2013.01); *H04L 5/0055* (2013.01); *H04L 27/26* (2013.01); *H04W 72/042* (2013.01); *H04W 72/1289* (2013.01)

(58) Field of Classification Search
CPC ..... H04L 5/001; H04L 5/0007; H04L 5/0051; H04L 5/0053; H04L 5/0055; H04L 5/0094; H04L 27/26
See application file for complete search history.

(56) References Cited

U.S. PATENT DOCUMENTS

| | | | |
|---|---|---|---|
| 2013/0242882 A1* | 9/2013 | Blankenship | H04L 5/0041 370/329 |
| 2014/0128085 A1* | 5/2014 | Charbit | H04L 5/00 455/450 |
| 2015/0055485 A1* | 2/2015 | Kim | H04W 72/005 370/242 |
| 2016/0043849 A1* | 2/2016 | Lee | H04W 72/042 370/329 |
| 2017/0135116 A1* | 5/2017 | Kuchibhotla | H04W 72/0406 |
| 2020/0045618 A1* | 2/2020 | Chang | H04W 48/12 |

OTHER PUBLICATIONS

Qualcomm Incorporated: "Further Details on PHY Layer Options for LAA", 3GPP Draft; R1-152791—Further Details on PHY Layer Options for LAA, 3rd Generation Partnership Project (3GPP), Mobile Competence Centre; 650, Route Des Lucioles; F-06921 Sophia-Antipolis Cedex; France, vol. RAN WG1, No. Fukuoka, Japan; May 25, 2015-May 29, 2015 May 24, 2015 (May 24, 2015), pp. 1-7, XP050973354, Retrieved from the Internet: URL: http://www.3gpp.org/ftp/Meetings_3GPP_SYNC/RAN1/Docs/ [retrieved on May 24, 2015].

* cited by examiner

COMMON SEARCH SPACE DESIGN FOR COVERAGE ENHANCEMENT IN WIRELESS COMMUNICATIONS

CROSS REFERENCES

The present application for patent claims the benefit of U.S. Provisional Patent Application No. 62/560,092 by Liu, et al., entitled "Common Search Space Design For Coverage Enhancements in Wireless Communications," filed Sep. 18, 2017, assigned to the assignee hereof, and expressly incorporated by reference in its entirety.

BACKGROUND

The following relates generally to wireless communication, and more specifically to common search space design for coverage enhancement in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as a Long Term Evolution (LTE) systems or LTE-Advanced (LTE-A) systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

An example of an emerging radio access technology (RAT) or wireless telecommunication standard is the MulteFire RAT, in which stand-alone connections between base stations and UEs may be established using shared radio frequency spectrum (e.g., unlicensed radio frequency spectrum). In some cases, a base station may transmit transmission resource assignments and other control information for a UE or group of UEs in a physical downlink control channel (PDCCH). The PDCCH may indicate information such as paging information, system information, random access information, power control information, etc. However, some wireless communications systems may include information for a common search space within a limited number of resources reserved for PDCCH information.

SUMMARY

The described techniques relate to improved methods, systems, devices, or apparatuses that support common search space design for coverage enhancement in wireless communications. Generally, the described techniques provide for identifying a first common search space for an enhanced physical downlink control channel (ePDCCH) and communicating an indication of the first common search space via a master information block (MIB). A user equipment (UE) may monitor a set of control elements and may decode a system information block (SIB) grant (e.g., a Multefire SIB (SIB-MF1) grant) based on the monitored set of control channel elements. In some cases, the first common search space may be associated with a common PDCCH (C-PDCCH) and the UE may decode the C-PDCCH. The size of the first common search space, a transmission mode of the ePDCCH, or a combination thereof may be based on a set of bits received within the MIB. Resources may be allocated for the C-PDCCH, the SIB-MF1 grant, or a combination thereof based on the size of the first common search space. The transmission mode of the ePDCCH may include a distributed transmission mode or a localized transmission mode. A second common search space may be determined based on the first common search space. The resources for the second search space may be allocated according to the contents of the SIB-MF1 payload, which may be indicated by the SIB-MF1 grant in the ePDCCH. The second common search space may be associated with a type-1 downlink control information (DCI), and the first common search space may be associated with a type-0 DCI. A SIB, a random access message, a paging message, a transmit power control (TPC) message, or a combination thereof may also be indicated and based on the first or second common search space. The set of monitored control elements may be a fixed set.

A method of wireless communication is described. The method may include receiving, from a base station, a MIB, determining, based on the MIB, a common search space for a PDCCH, monitoring a set of control channel elements of the common search space, and decoding a SIB grant (e.g., SIB-MF1 grant) based on the monitored set of control elements. In some cases, the set of control channel elements may be associated with a C-PDCCH, and the C-PDCCH may be decoded based on the monitored set of control channel elements.

An apparatus for wireless communication is described. The apparatus may include means for receiving, from a base station, a MIB, means for determining, based on the MIB, a common search space for a PDCCH, means for monitoring a set of control channel elements of the common search space, and means for decoding a SIB grant (e.g., SIB-MF1 grant) based on the monitored set of control elements. In some cases, the set of control channel elements may be associated with a C-PDCCH, and the apparatus may include means for decoding the C-PDCCH based on the monitored set of control channel elements.

Another apparatus for wireless communication is described. The apparatus may include a processor, memory in electronic communication with the processor, and instructions stored in the memory. The instructions may be operable to cause the processor to receive, from a base station, a MIB, determine, based on the MIB, a common search space for a PDCCH, monitor a set of control channel elements of the common search space, and decode a SIB grant (e.g., a SIB-MF1 grant) based on the monitored set of control channel elements. In some cases, the set of control channel elements may be associated with a C-PDCCH, and the instructions may be operable to cause the processor to decode the C-PDCCH based on the monitored set of control channel elements.

A non-transitory computer readable medium for wireless communication is described. The non-transitory computer-readable medium may include instructions operable to cause a processor to receive, from a base station, a MIB, determine, based on the MIB, a common search space for a PDCCH, monitor a set of control channel elements of the common search space, and decode a SIB grant (e.g., a SIB-MF1 grant) based on the monitored set of control channel elements. In some cases, the set of control channel elements may be associated with a C-PDCCH, and the non-transitory computer-readable medium may include instructions operable to cause a processor to decode the C-PDCCH based on the monitored set of control channel elements.

Some examples of the method, apparatus, and non-transitory computer-readable medium described above may further include processes, features, means, or instructions for decoding a SIB grant based on the monitored set of control channel elements, where the SIB grant may be a SIB-MF1 grant.

In some examples of the method, apparatus, and non-transitory computer-readable medium described above, receiving the MIB includes receiving a set of bits corresponding to the MIB, where the common search space may be determined based on the set of bits.

In some examples of the method, apparatus, and non-transitory computer-readable medium described above, at least a portion of the set of bits indicates a size of the common search space, a transmission mode of an ePDCCH, or a combination thereof.

Some examples of the method, apparatus, and non-transitory computer-readable medium described above may further include processes, features, means, or instructions for determining a location of the SIB-MF1 grant based on the set of bits.

Some examples of the method, apparatus, and non-transitory computer-readable medium described above may further include processes, features, means, or instructions for determining, based on the size of the common search space, a channel for the C-PDCCH, a resource allocation for the C-PDCCH, a location of a SIB-MF1 grant, or a combination thereof.

In some examples of the method, apparatus, and non-transitory computer-readable medium described above, the transmission mode of the ePDCCH includes one of a distributed transmission mode or a localized transmission mode.

Some examples of the method, apparatus, and non-transitory computer-readable medium described above may further include processes, features, means, or instructions for identifying a second common search space that overlaps the determined common search space.

In some examples of the method, apparatus, and non-transitory computer-readable medium described above, identifying the second common search space includes decoding a SIB-MF1 grant based on the determined common search space. Some examples of the method, apparatus, and non-transitory computer-readable medium described above may further include processes, features, means, or instructions for determining a resource allocation of the second common search space based on a SIB-MF1 payload scheduled by the decoded SIB-MF1 grant.

In some examples of the method, apparatus, and non-transitory computer-readable medium described above, the second common search space may be associated with type-1 DCI and the determined common search space may be associated with type-0 DCI.

Some examples of the method, apparatus, and non-transitory computer-readable medium described above may further include processes, features, means, or instructions for receiving a SIB, a random access message, a paging message, a TPC message, or a combination thereof based on the common search space.

In some examples of the method, apparatus, and non-transitory computer-readable medium described above, the set of control channel elements may be a fixed set.

A method of wireless communication is described. The method may include identifying a common search space for an ePDCCH, allocating a first set of control channel elements within the common search space to a C-PDCCH, and transmitting, to a UE, DCI over the allocated set of control channel elements.

An apparatus for wireless communication is described. The apparatus may include means for identifying a common search space for an ePDCCH, means for allocating a first set of control channel elements within the common search space to a C-PDCCH, and means for transmitting, to a UE, DCI over the allocated set of control channel elements.

Another apparatus for wireless communication is described. The apparatus may include a processor, memory in electronic communication with the processor, and instructions stored in the memory. The instructions may be operable to cause the processor to identify a common search space for an ePDCCH, allocate a first set of control channel elements within the common search space to a C-PDCCH, and transmit, to a UE, DCI over the allocated set of control channel elements.

A non-transitory computer readable medium for wireless communication is described. The non-transitory computer-readable medium may include instructions operable to cause a processor to identify a common search space for an ePDCCH, allocate a first set of control channel elements within the common search space to a C-PDCCH, and transmit, to a UE, DCI over the allocated set of control channel elements.

Some examples of the method, apparatus, and non-transitory computer-readable medium described above may further include processes, features, means, or instructions for allocating a second set of control elements within the common search space to a SIB, a SIB-MF1 grant, a random access message, a paging message, a TPC message, or a combination thereof.

Some examples of the method, apparatus, and non-transitory computer-readable medium described above may further include processes, features, means, or instructions for identifying a second common search space overlapping with the identified common search space, where the second common search space may be associated with type-1 DCI and the identified common search space may be associated with type-0 DCI.

Some examples of the method, apparatus, and non-transitory computer-readable medium described above may further include processes, features, means, or instructions for transmitting a MIB that indicates information for the C-PDCCH, a SIB-MF1 grant, a transmission mode of the ePDCCH, or a combination thereof.

In some examples of the method, apparatus, and non-transitory computer-readable medium described above, a set of bits of the MIB indicate a size of the common search space and/or a transmission mode of the ePDCCH.

DETAILED DESCRIPTION

Figure 1:
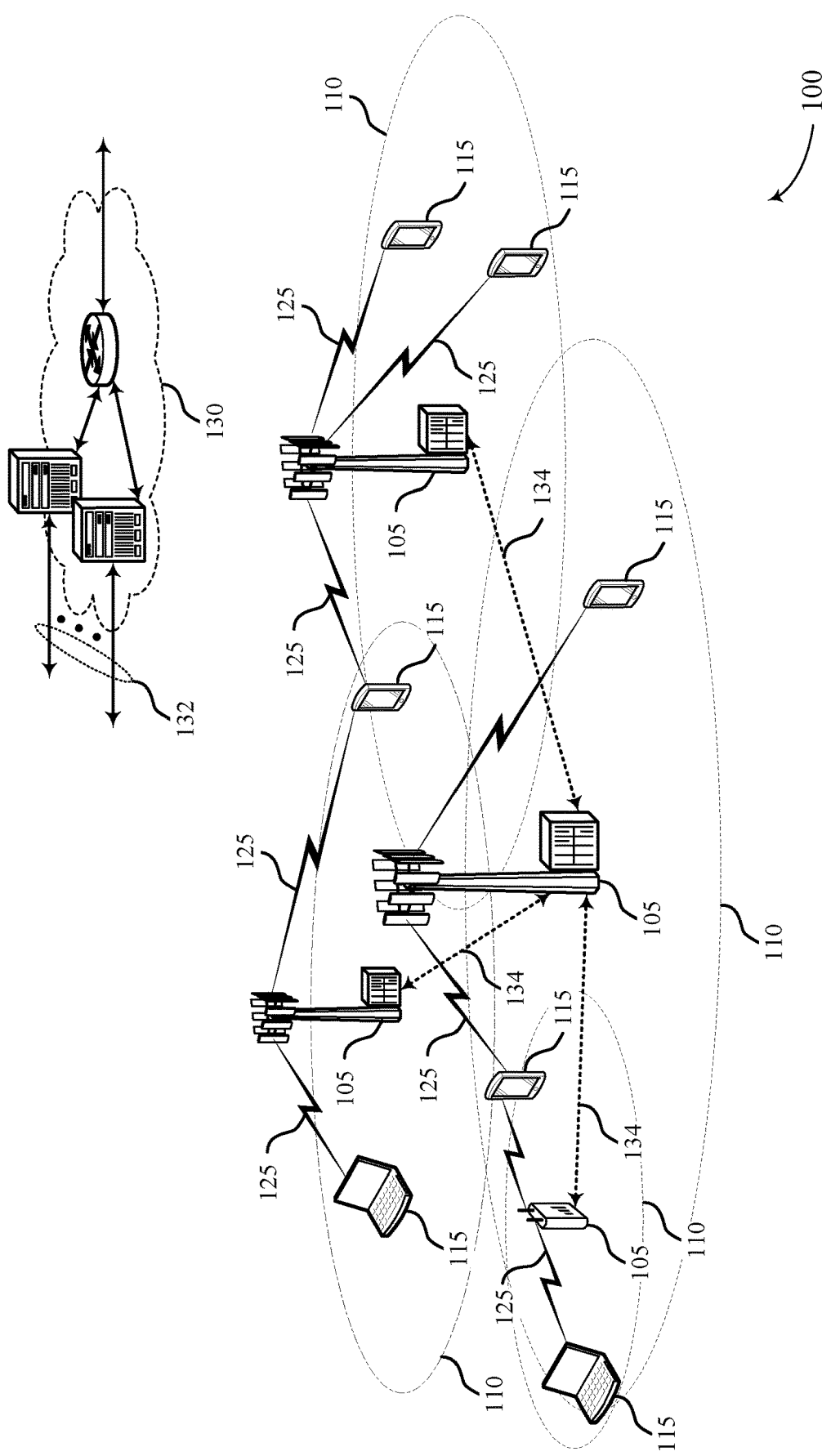
FIG. 1 illustrates an example of a wireless communications system that supports common search space design for coverage enhancement in wireless communications in accordance with aspects of the present disclosure.

In some wireless communications systems, a base station may transmit a master information block (MIB) to a user equipment (UE) (e.g., during or prior to cell acquisition). In some cases, the base station and UE may communicate over a MulteFire connection. The MIB may contain information for communicating with the base station, such as system bandwidth information, a system frame number (SFN) (e.g., the most significant 8 bits of the 10 bit SFN), a physical hybrid access request (HARD) indicator channel (PHICH) configuration, a number of transmit antennas at the base station, or other control information related to cell acquisition. In some cases, the MIB may also contain relevant information for wireless devices which have already acquired the network (e.g., updates on control channel formatting). The MIB may further indicate a common search space for a physical downlink control channel (PDCCH). The common search space is monitored by all UEs served by the base station and may include information such as paging information, system information, random access procedures, power control information, etc., within control channel elements (CCEs). In some cases, the PDCCH may have a limited signal-to-interference ratio (SINR) based on an aggregation level (i.e., number of repetitions of CCEs) that results in limited coverage. Additionally, the PDCCH may support a limited number of scheduling grants.

The base station may utilize a control channel (e.g., an enhanced PDCCH (ePDCCH)) that supports higher aggregation levels (e.g., 64) to improve coverage and a higher number of grants (e.g., MulteFire system information block (SIB-MF1) grants). The control channel may include resource blocks (RBs) that each contain a set number of CCEs (e.g., 4) such that a less number of RBs may support the control channel (e.g., 16 RBs with 4 CCEs each may support an ePDCCH at an aggregation level of 64). The control channel may support physical RB pairs and a search space in a combined set. Additionally, the control channel may support a common search space by scrambling demodulation reference signals (DMRSs) by cell ID. The control channel may further include separated RBs for the common search space and RBs for UE-specific search spaces. The base station may define one or more common search spaces for grant scheduling (e.g., SIB-MF1 grants) or frame structure signaling (e.g., in common PDCCH (C-PDCCH)) and signal the resource allocation for the common search spaces to a UE within a MIB.

In some cases, each common search space may include a fixed set of CCEs that the UE monitors for decoding the frame structure signaling or grant scheduling. Additionally, the common search space may include a set number of RBs (e.g., 16 RBs), where a first set of RBs may be dedicated for the frame structure signaling. Additionally or alternatively, the entire set of RBs may be utilized for the grant scheduling (e.g., via a SIB-MF1 grant). Alternatively, if the common search space occurs in a subframe without any grant scheduling, the first set of RBs may be dedicated for the frame structure signaling and no RBs may be utilized for the grant scheduling. In some cases, the base station may hardcode the RBs for the frame structure signaling and grant scheduling. Alternatively, the base station may signal the RBs for each of the frame structure signaling and/or grant scheduling within the common search space via reserved bits in the MIB.

The base station may further signal additional common search spaces for additional information, such as grants for random access, paging, system information (e.g., system information blocks (SIB-X), and transmit power control (TPC). The resource allocation of the additional common search space may be indicated by the grant scheduling within the initial common search space. In some cases, the additional common search space may overlap the initial common search space to save resources. Additionally or alternatively, the base station may utilize the same common search space for the frame structure signaling, grant scheduling, or the additional information.

Aspects of the disclosure are initially described in the context of wireless communications systems. Examples of resource allocations for common search spaces and grant scheduling are then described. Aspects of the disclosure are further illustrated by and described with reference to apparatus diagrams, system diagrams, and flowcharts that relate to common search space design for coverage enhancement in wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions, from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications may be carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at multiple antenna elements of an antenna array, or by processing received signals according to different receive beamforming weight sets applied to signals received at multiple antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based on listening according to different receive beam directions (e.g., a beam direction determined to have a highest signal strength, highest signal-to-noise ratio, or otherwise acceptable signal quality based on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots may be aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling.

A carrier may be associated with a pre-defined frequency channel (e.g., an E-UTRA absolute radio frequency channel number (EARFCN)) and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing may be inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a CA configuration. CA may be used with both FDD and TDD component carriers.

In some cases, wireless communications system 100 may utilize enhanced CCs (eCCs). An eCC may be characterized by one or more features including wider carrier or frequency channel bandwidth, shorter symbol duration, shorter TTI duration, or modified control channel configuration. In some cases, an eCC may be associated with a CA configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that may not be capable of monitoring the whole carrier bandwidth or may be otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

A base station 105 may transmit a MIB to a UE 115, where the MIB includes a block of system information which includes a limited number of the most frequently transmitted parameters which may be essential for a UEs initial access to the network—namely the downlink system bandwidth, an indicator of the resources allocated to HARQ acknowledgement signaling in the downlink, and the System Frame Number (SFN). After completing initial cell synchronization, the UE 115 may decode the MIB, SIB1 and SIB2 prior to accessing the network. In some cases, the UE 115 may decode the MIB before completing initial cell acquisition for a MulteFire connection. The MIB carries a few important pieces of information for UE initial access, including downlink channel bandwidth in term of RBs, physical hybrid access request indicator channel (PHICH) configuration (duration and resource assignment), and SFN. The MIB may further indicate a common search space for a PDCCH.

The PDCCH may be used to support efficient data transmission. A PDCCH carries a message known as downlink control information (DCI), which includes transmission resource assignments and other control information for a UE 115 or group of UEs 115. Many PDCCHs can be transmitted in a subframe. PDCCH carries DCI in at least one CCE, which may consist of nine logically contiguous resource element groups (REGs), where each REG contains 4 resource elements. DCI may include information regarding downlink scheduling assignments, uplink resource grants, transmission scheme, uplink power control, HARQ information, modulation and coding scheme (MCS), and other information. The size and format of the DCI messages may differ depending on the type and amount of information that is carried by the DCI. For example, if spatial multiplexing is supported, the size of the DCI message may be large compared to contiguous frequency allocations. Similarly, for a system that employs MIMO, the DCI may include additional signaling information. DCI size and format depend on the amount of information as well as factors such as bandwidth, the number of antenna ports, and duplexing mode. PDCCH can carry DCI messages associated with multiple users, and each UE 115 may decode the DCI messages that are intended for it. For example, each UE 115 may be assigned a cell radio network temporary identifier (C-RNTI) and CRC bits attached to each DCI may be scrambled based on the C-RNTI.

To reduce power consumption and overhead at a UE 115, a limited set of CCE locations may be specified for DCI associated with a specific UE 115. CCEs may be grouped (e.g., in groups of 1, 2, 4 and 8 CCEs), and a set of CCE locations in which the UE 115 may find relevant DCI may be specified. The number of CCEs may correspond to an aggregation level (e.g., an aggregation level of 64 corresponds to 64 CCEs). These CCEs may be known as a search space. The search space can be partitioned into two regions (e.g., a common CCE region or search space and a UE-specific (dedicated) CCE region or search space). The common CCE region (i.e., common search space) may be monitored by all UEs 115 served by a base station 105 and may include information such as paging information, system information, random access procedures and the like. The UE-specific search space may include user-specific control information. CCEs may be indexed, and the common search space may start from CCE 0. The starting index for a UE-specific search space depends on the C-RNTI, the subframe index, the CCE aggregation level and a random seed. Table 1 shows the number of CCEs in a PDCCH for different frequencies based on the number of OFDM symbols utilized for the PDCCH.

TABLE 1

Number of CCEs in PDCCH

| Number of OFDM | Bandwidth | |
| --- | --- | --- |
| Symbols | 10 MHz | 20 MHz |
| 1 | 10 | 21 |
| 2 | 27 | 55 |
| 3 | 44 | 88 |

In some cases, the PDCCH may have a limited SINR (e.g., −5 dB to −6 dB) based on an aggregation level (e.g., aggregation level of 8) that results in limited coverage and may support a limited number of scheduling grants (e.g., one grant). Wireless communications system 100 may support efficient techniques for utilizing an ePDCCH that supports a common search space for enhanced coverage. A base station 105 may utilize a control channel (e.g., an ePDCCH) that supports higher aggregation levels (e.g., 64) to improve coverage and a higher number of grants (e.g., SIB-MF1 grants). The control channel may include RBs that each contain a set number of CCEs (e.g., 4) such that a less number of RBs may support the control channel (e.g., 16 RBs with 4 CCEs each may support an ePDCCH at an aggregation level of 64). The control channel may support physical RB pairs and a search space in a combined set. Additionally, the control channel may support a common search space by scrambling DMRS by cell ID. The control channel may further include separated RBs for the common search space and RBs for UE-specific search spaces. The base station 105 may define one or more common search spaces for grant scheduling (e.g., SIB-MF1 grants) or frame structure signaling (e.g., in C-PDCCH), and may signal the resource allocation for the common search spaces to a UE 115 within a MIB.

In some cases, each common search space may include a fixed set of CCEs that the UE 115 monitors for decoding the frame structure signaling or grant scheduling. Additionally, the common search space may include a set number of RBs (e.g., 16 RBs), where a first set of RBs may be dedicated for the frame structure signaling. Additionally or alternatively, the entire set of RBs may also be utilized for the grant scheduling. Alternatively, if the common search space occurs in a subframe without any grant scheduling, the first set of RBs may be dedicated for the frame structure signaling and no RBs may be utilized for the grant scheduling. In some cases, the base station 105 may hardcode the RBs for the frame structure signaling and grant scheduling. Alternatively, the base station 105 may signal the RBs for each of the frame structure signaling or grant scheduling within the common search space via reserved bits in the MIB.

The base station 105 may further signal additional common search spaces for additional information, such as grants for random access, paging, system information (e.g., SIB-X), and TPC. The resource allocation of the additional common search space may be indicated by the grant scheduling within the initial common search space. In some cases, the additional common search space may overlap the initial common search space to save resources. Additionally or alternatively, the base station 105 may utilize the same common search space for one or more of the frame structure signaling, grant scheduling, and the additional information.

Figure 2:
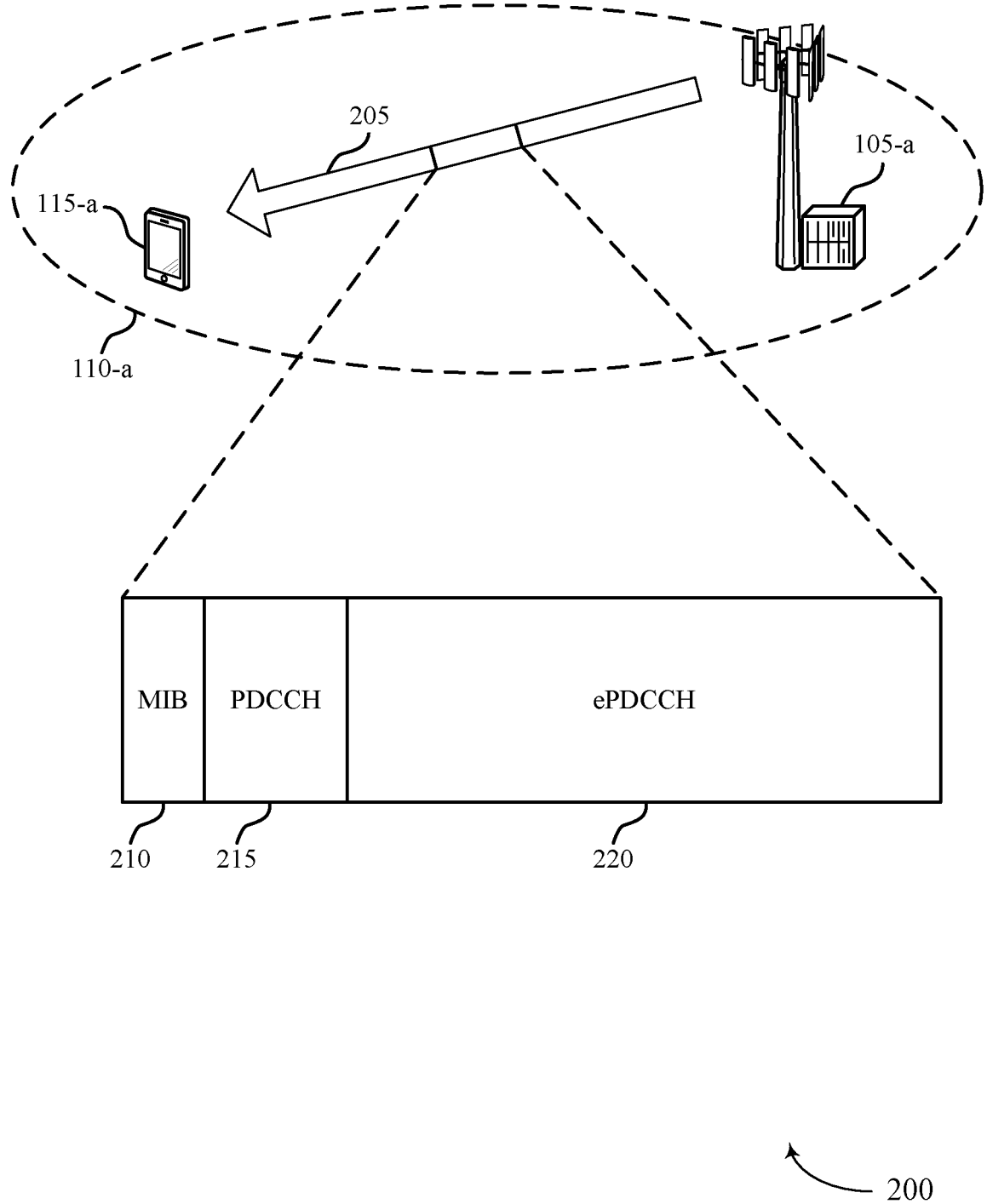
FIG. 2 illustrates an example of a wireless communications system that supports common search space design for coverage enhancement in wireless communications in accordance with aspects of the present disclosure.

FIG. 2 illustrates an example of a wireless communications system 200 that supports common search space design for coverage enhancement in wireless communications in accordance with various aspects of the present disclosure. In some examples, wireless communication system 200 may implement aspects of wireless communication system 100. Wireless communications system 200 may include a base station 105-a and a UE 115-a, which may be examples of corresponding base stations 105 and UEs 115 as described with reference to FIG. 1. Base station 105-a may transmit downlink information to UE 115-a on resources of a carrier 205 when UE 115-a is within coverage area 110-a. In some cases, the downlink information may include frame structure signaling (i.e., C-PDCCH) and/or scheduling grants for a MulteFire connection (i.e., SIB-MF1 grants) between base station 105-a and UE 115-a.

Base station 105-a may define a common search space (e.g., type-0 common search space) for the C-PDCCH or SIB-MF1 grants and signal the resource allocation for the common search space over MIB 210. The common search space may include RBs for PDCCH 215 and ePDCCH 220. ePDCCH 220 may support higher aggregation levels (e.g., 64) to improve coverage and allow a higher number of grants (e.g., SIB-MF1 grants). ePDCCH 220 may include RBs that each contain a set number of CCEs (e.g., 4) such that a less number of RBs may support ePDCCH 220 (e.g., 16 RBs with 4 CCEs each may support an ePDCCH at an aggregation level of 64). ePDCCH 220 may support physical RB pairs and a search space in a combined set. Additionally, ePDCCH 220 may support a common search space by scrambling a DMRS using a cell ID. ePDCCH 220 may further include separated RBs for the common search space and RBs for UE-specific search spaces. Base station 105-*a* may define one or more common search spaces for grant scheduling (e.g., SIB-MF1 grants) and/or frame structure signaling (e.g., in C-PDCCH) and signal the resource allocation for the common search spaces to UE 115-*a* within MIB 210.

Additionally, the common search space may include a set number of RBs (e.g., 16 RBs), where a first set of RBs may be dedicated for the c-PDCCH. Additionally or alternatively, the entire set of RBs may be also utilized for the SIB-MF1. Alternatively, if the common search space occurs in a subframe without any grant scheduling, the first set of RBs may be dedicated for the c-PDCCH and no RBs may be utilized for the SIB-MF1. In some cases, base station 105-*a* may hardcode the RBs for the c-PDCCH and SIB-MF1. Alternatively, base station 105-*a* may signal the RBs for each of the c-PDCCH and SIB-MF1 within the common search space via reserved bits (e.g., seven (7) bits available) in MIB 210.

In some cases, base station 105-*a* may utilize two (2) or more bits in MIB 210 to indicate the size of the type-0 common search space. For example, the type-0 common search space may have a size of zero (0), where the C-PDCCH or SIB-MF1 grant may be on PDCCH 215. In other examples, the type-0 common search space may have a size of eight (8), where the SIB-MF1 grant may be on PDCCH 215 and the C-PDCCH may be on ePDCCH 220. In other examples, the type-0 common search space may have a size of 16, where eight (8) RBs may be dedicated for the C-PDCCH and the SIB-MF1 grant shares those eight (8) RBs and has eight (8) more dedicated RBs. Alternatively, there may be no RBs dedicated for the C-PDCCH and all of the 16 RBs may be dedicated for the SIB-MF1 grant. In other examples, the type-0 common search space may have a size of 24, where eight (8) RBs may be dedicated for the C-PDCCH and 16 RBs may be dedicated for the SIB-MF1 grant. Additionally or alternatively, base station 105-*a* may utilize one (1) bit in MIB 210 to signal distributed or localized ePDCCH transmission modes. In some cases, the distributed ePDCCH transmission mode may include CCEs distributed across the entire ePDCCH 220. Alternatively, the localized ePDCCH transmission mode may include CCEs grouped together on adjacent RBs. UE 115-*a* may monitor the RBs for the CCEs to decode the C-PDCCH or SIB-MF1 grants to establish a MulteFire connection with base station 105-*a*.

Figure 3:
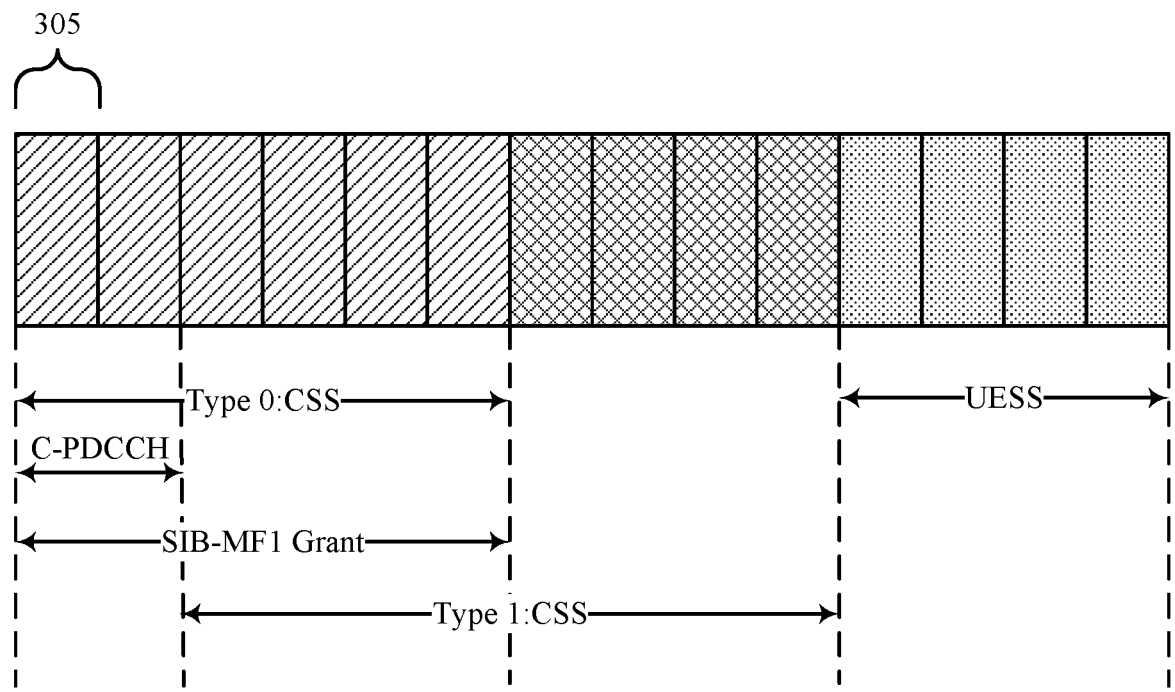
FIG. 3 illustrates an example of a resource allocation that supports common search space design for coverage enhancement in wireless communications in accordance with aspects of the present disclosure.

FIG. 3 illustrates an example of a resource allocation 300 that supports common search space design for coverage enhancement in wireless communications in accordance with various aspects of the present disclosure. In some examples, resource allocation 300 may implement aspects of wireless communications systems 100 and 200. Resource allocation 300 may include an allocation of sets of RBs 305 for one or more common search spaces. Each set of RBs 305 may include four (4) RBs and 16 CCEs. As such, each set of RBs 305 may have an aggregation level of 16 (i.e., 4 RBs×4 CCEs each=16 total CCEs). Each set of RBs 305 may include RBs as defined in the frequency domain.

A type-0 common search space may include the first six (6) sets of RBs 305 (i.e., 24 total RBs). The size of the type-0 common search space may be determined and signaled as discussed with reference to FIG. 2. In some cases, the type-0 common search space may include a C-PDCCH on CCEs on the first two sets of RBs 305 (e.g., the first eight (8) RBs). The number of RBs dedicated for the C-PDCCH may vary and be determined by the network (e.g., a base station 105). Additionally or alternatively, the type-0 common search space may include a SIB-MF1 grant that may be signaled across CCEs on all RBs 305 of the type-0 common search space. A UE 115 may monitor the CCEs within each set of RBs 305 for the corresponding C-PDCCH and/or SIB-MF1 grant for establishing a MulteFire connection with a base station 105. After successfully decoding the SIB-MF1 grant and establishing the initial MulteFire connection, the base station 105 may transmit additional grants for random access, paging, additional system information blocks (e.g., SIB-X), and TPC.

The base station 105 may signal additional common search spaces (e.g., type-1 common search space) for the additional information, including the grants for random access, paging, SIB-X, and TPC. The resource allocation of the type-1 common search space may be indicated by the SIB-MF1 grant within the type-0 common search space. In some cases, the type-1 common search space may overlap with the type-0 common search space to save resources. Depending on the number of RBs and aggregation level, different number of candidates (e.g., PDCCH candidates) may be supported within the type-1 common search space. For example, 16 RBs at an aggregation level of 32 may support two (2) candidates, and 16 RBs at an aggregation level of 64 may support one (1) candidate. After the dedicated RBs for the common search spaces end, the remaining RBs may be dedicated for a UE-specific search space.

In some cases, a PDCCH region may serve non-wideband coverage extension (non-WCE) UEs 115 and scheduled data may multiplex with WCE DCIS after the PDCCH region. Additionally, an ePDCCH region and the PDCCH region may schedule overlapping resources. For example, UEs 115 in both WCE and non-WCE modes may be instructed to look into or monitor the same physical downlink shared channel (PDSCH) subframe for a paging message.

Figure 4:
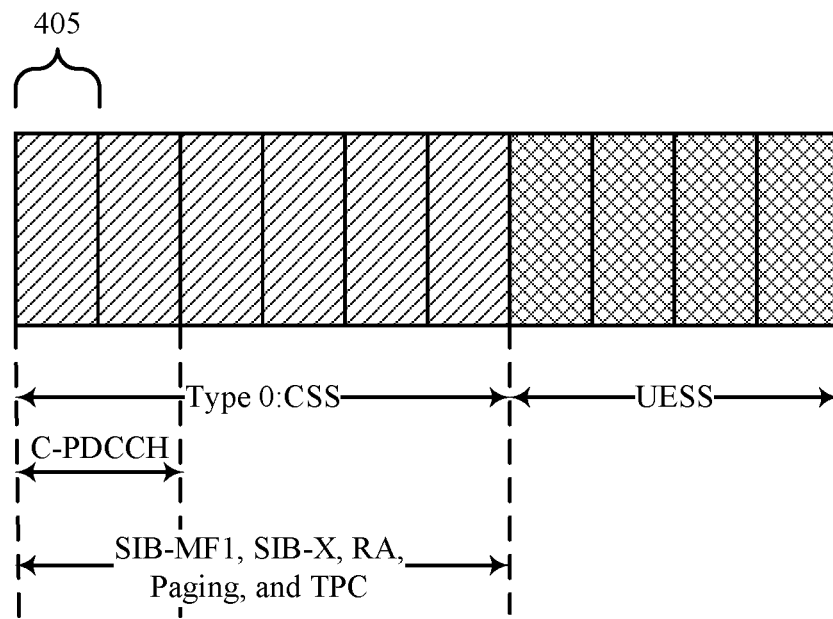
FIG. 4 illustrates an example of a resource allocation that supports common search space design for coverage enhancement in wireless communications in accordance with aspects of the present disclosure.

FIG. 4 illustrates an example of a resource allocation 400 that supports common search space design for coverage enhancement in wireless communications in accordance with various aspects of the present disclosure. In some examples, resource allocation 400 may implement aspects of wireless communication systems 100 and 200. Resource allocation 400 may include an allocation of sets of RBs 405 for one or more common search spaces. Each set of RBs 405 may include four (4) RBs and 16 CCEs. As such, each set of RBs 405 may have an aggregation level of 16 (i.e., 4 RBs×4 CCEs each=16 total CCEs). Each set of RBs 405 may include RBs as defined in the frequency domain. As discussed with reference to FIG. 3, a C-PDCCH may occupy CCEs on the first two sets of RBs 405, and sets of RBs 405 may be dedicated for a UE-specific search space after a type-0 common search space.

Resource allocation 400 may illustrate an example of allocating resources such that grants for SIB-MF1, SIB-X, random access, paging, and TPC occur over the same sets of RBs 405 of the type-0 common search space. As such, a base station 105 may not include signaling for an additional common search space (e.g., a type-1 common search space) in SIB-MF1. Additionally, the number of blind decodes for the connection information to establish a MulteFire connection may be reduced and a more efficient use of the RBs within the type-0 common search space may be achieved. For example, blind decoding may occur over a set of eight (8) RBs, a set of (8+8) RBs, or a set of 8+(8+8) RBs. Additionally, a maximum total of 24 RBs may support one candidate at an aggregation level of 32 and one candidate at an aggregation level of 64.

Figure 5:
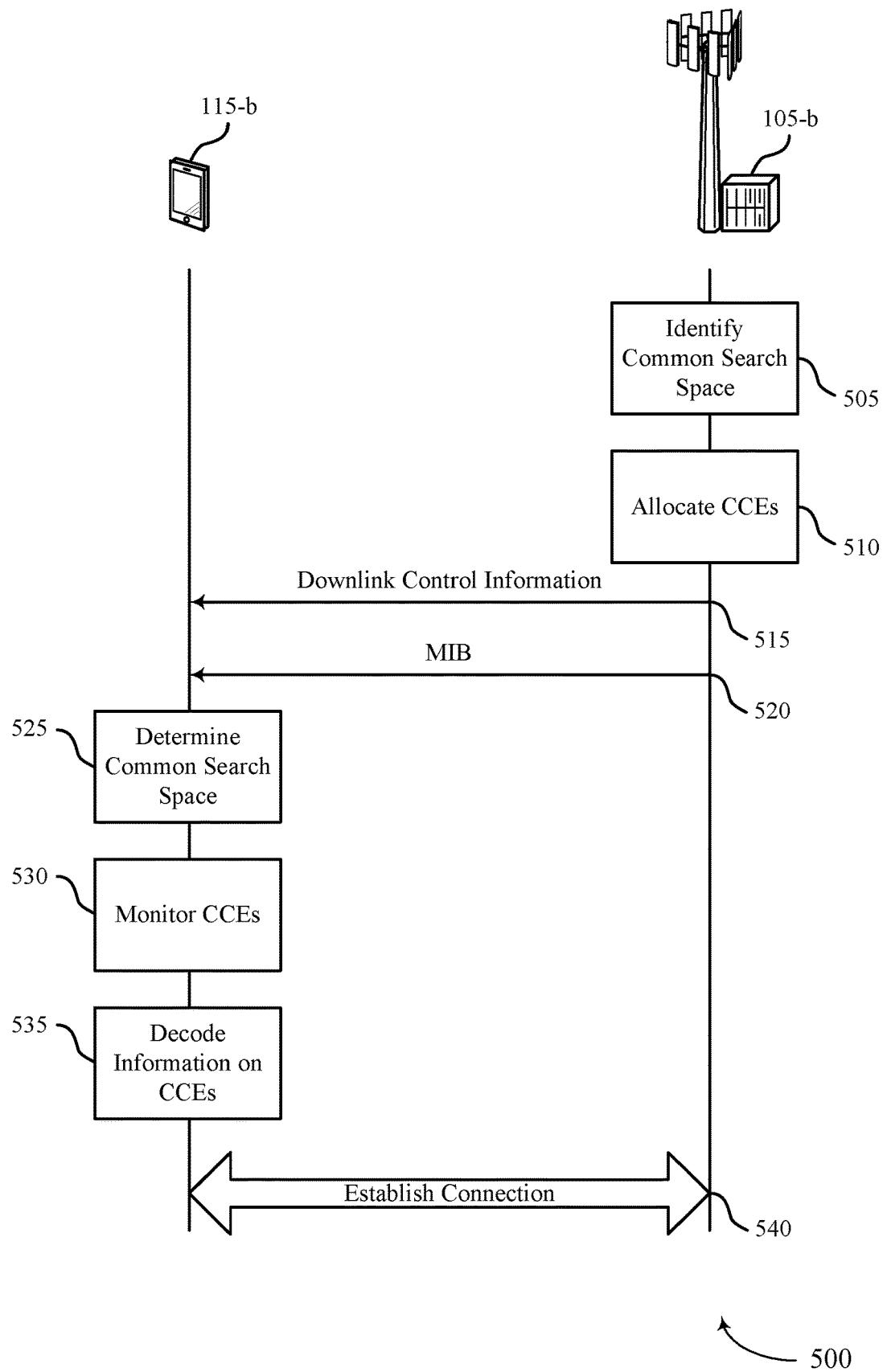
FIG. 5 illustrates an example of a process flow that supports common search space design for coverage enhancement in wireless communications in accordance with aspects of the present disclosure.

FIG. 5 illustrates an example of a process flow 500 that supports common search space design for coverage enhancement in wireless communications in accordance with various aspects of the present disclosure. In some examples, process flow 500 may implement aspects of wireless communications systems 100 and 200. Process flow 500 illustrates aspects of techniques performed by a base station 105-b and a UE 115-b, which may be examples of a base station 105 and a UE 115 as described with reference to FIGS. 1 through 4.

In the following description of the process flow 500, the operations between the UE 115-b and base station 105-b may be performed in different orders or at different times. Certain operations may also be left out of the process flow 500, or other operations may be added to the process flow 500.

At 505, base station 105-b may identify a common search space for an ePDCCH. In some cases, base station 105-b may identify a second common search space overlapping with the identified common search space, where the second common search space may be associated with type-1 DCI and the identified common search space may be associated with type-0 DCI.

At 510, base station 105-b may allocate a first set of CCEs within the common search space to a C-PDCCH. In some cases, base station 105-b may allocate a second set of control elements within the common search space to SIB, a SIB-MF1 grant, a random access message, a paging message, a TPC message, or a combination thereof.

At 515, base station 105-b may transmit to UE 115-b DCI over the first set of control channel elements. At 520, base station 105-b may transmit a MIB that indicates information for the C-PDCCH, a SIB-MF1 grant, a transmission mode of the ePDCCH, or a combination thereof. The set of bits of the MIB may indicate a size of the common search space and/or a transmission mode of the ePDCCH. UE 115-b may receive the set of bits corresponding to the MIB, where the common search space may be determined based on the set of bits. At least a portion of the set of bits may indicate a size of the common search space, a transmission mode of the ePDCCH, or a combination thereof.

At 525, UE 115-b may determine based on the MIB, a common search space for a PDCCH. Additionally, UE 115-b may determine (e.g., based on the size of the common search space) a channel for the C-PDCCH, a resource allocation for the C-PDCCH, a location of the SIB-MF1 grant, or a combination thereof. The location of the SIB-MF1 grant may be determined based on the set of bits of the MIB. The transmission mode of the ePDCCH may include one of a distributed transmission mode or a localized transmission mode. UE 115-b may identify and determine a second common search space based on the decoded MIB, where the second common search space overlaps the determined common search space. The second common search space may be associated with type-1 DCI and the determined common search space may be associated with type-0 DCI. UE 115-b may receive a SIB, a random access message, a paging message, a TPC message, or a combination thereof based on the common search space.

At 530, UE 115-b may monitor a set of control channel elements of the common search space, the set of CCEs associated with the C-PDCCH. The set of CCEs may be a fixed set.

At 535, UE 115-b may decode the C-PDCCH based on the monitored set of CCEs. Additionally or alternatively, UE 115-b may decode a SIB grant based on the monitored set of CCEs, where the SIB grant may be the SIB-MF1 grant. Alternatively, UE 115-b may decode the SIB-MF1 grant based on the determined common search space and may determine a resource allocation of the second common search space based on a SIB-MF1 payload scheduled by the decoded SIB-MF1 grant.

At 540, base station 105-b and UE 115-b may establish a connection based on successfully decoding the C-PDCCH and/or SIB-MF1 grant. In some cases, the connection may be a MulteFire connection.

Figure 6:
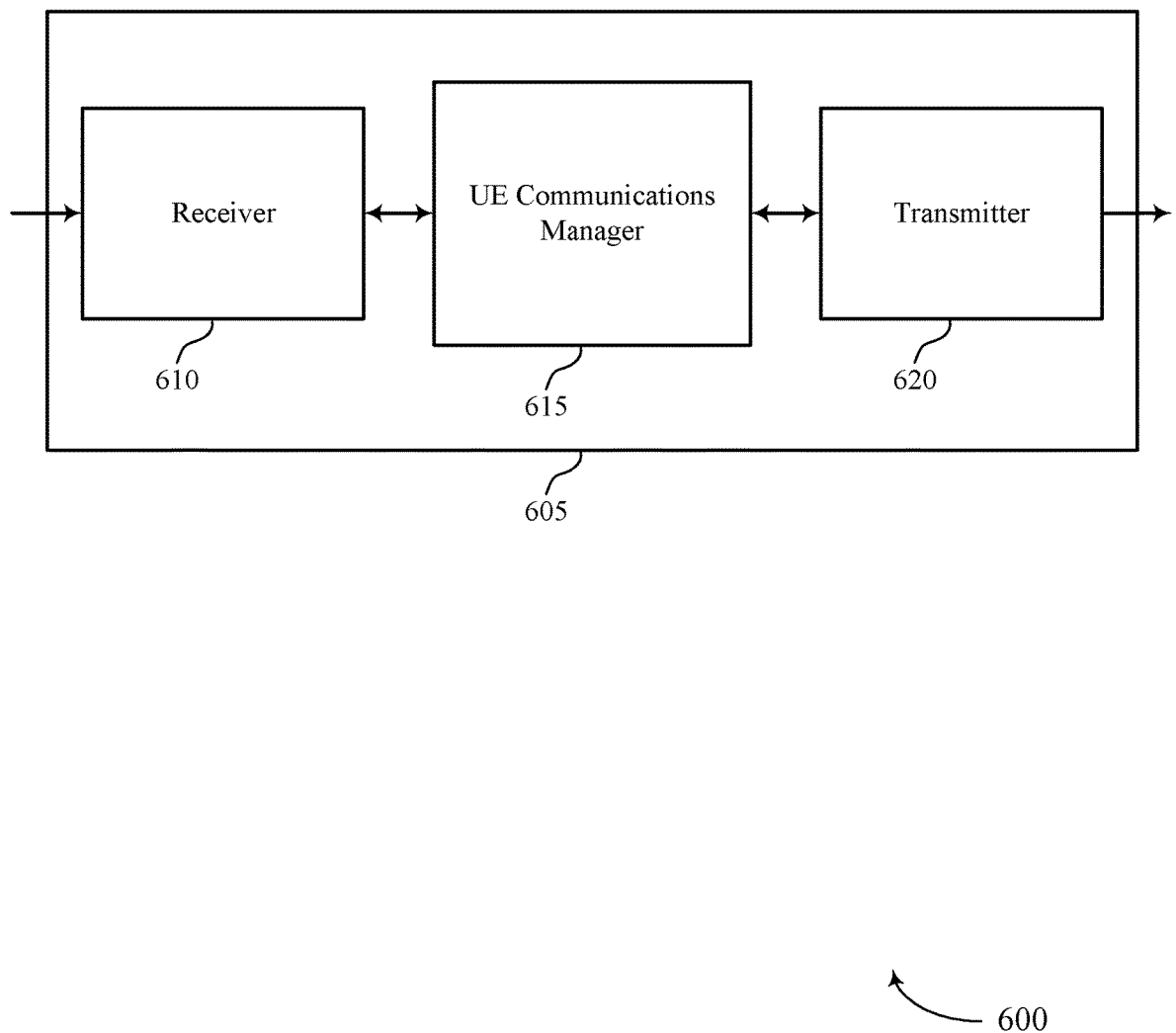
FIGS. 6 through 8 show block diagrams of a device that supports common search space design for coverage enhancement in wireless communications in accordance with aspects of the present disclosure.

FIG. 6 shows a block diagram 600 of a wireless device 605 that supports common search space design for coverage enhancement in wireless communications in accordance with aspects of the present disclosure. Wireless device 605 may be an example of aspects of a UE 115 as described herein. Wireless device 605 may include receiver 610, UE communications manager 615, and transmitter 620. Wireless device 605 may also include a processor. Each of these components may be in communication with one another (e.g., via one or more buses).

Receiver 610 may receive information such as packets, user data, or control information associated with various information channels (e.g., control channels, data channels, and information related to common search space design for coverage enhancement in wireless communications, etc.). Information may be passed on to other components of the device. The receiver 610 may be an example of aspects of the transceiver 935 described with reference to FIG. 9. The receiver 610 may utilize a single antenna or a set of antennas.

UE communications manager 615 may be an example of aspects of the UE communications manager 915 described with reference to FIG. 9.

UE communications manager 615 and/or at least some of its various sub-components may be implemented in hardware, software executed by a processor, firmware, or any combination thereof. If implemented in software executed by a processor, the functions of the UE communications manager 615 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure.

The UE communications manager 615 and/or at least some of its various sub-components may be physically located at various positions, including being distributed such that portions of functions are implemented at different physical locations by one or more physical devices. In some examples, UE communications manager 615 and/or at least some of its various sub-components may be a separate and distinct component in accordance with various aspects of the present disclosure. In other examples, UE communications manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE communications manager 615 may receive, from a base station 105, a MIB, determine, based on the MIB, a common search space for a PDCCH, monitor a set of control channel elements of the common search space, and decode a SIB grant (e.g., a SIB-MF1) based on the monitored set of control channel elements. In some cases, the set of control channel elements may be associated with a C-PDCCH, UE communications manager 615 and decode the C-PDCCH based on the monitored set of control channel elements.

Transmitter 620 may transmit signals generated by other components of the device. In some examples, the transmitter 620 may be collocated with a receiver 610 in a transceiver module. For example, the transmitter 620 may be an example of aspects of the transceiver 935 described with reference to FIG. 9. The transmitter 620 may utilize a single antenna or a set of antennas.

Figure 7:
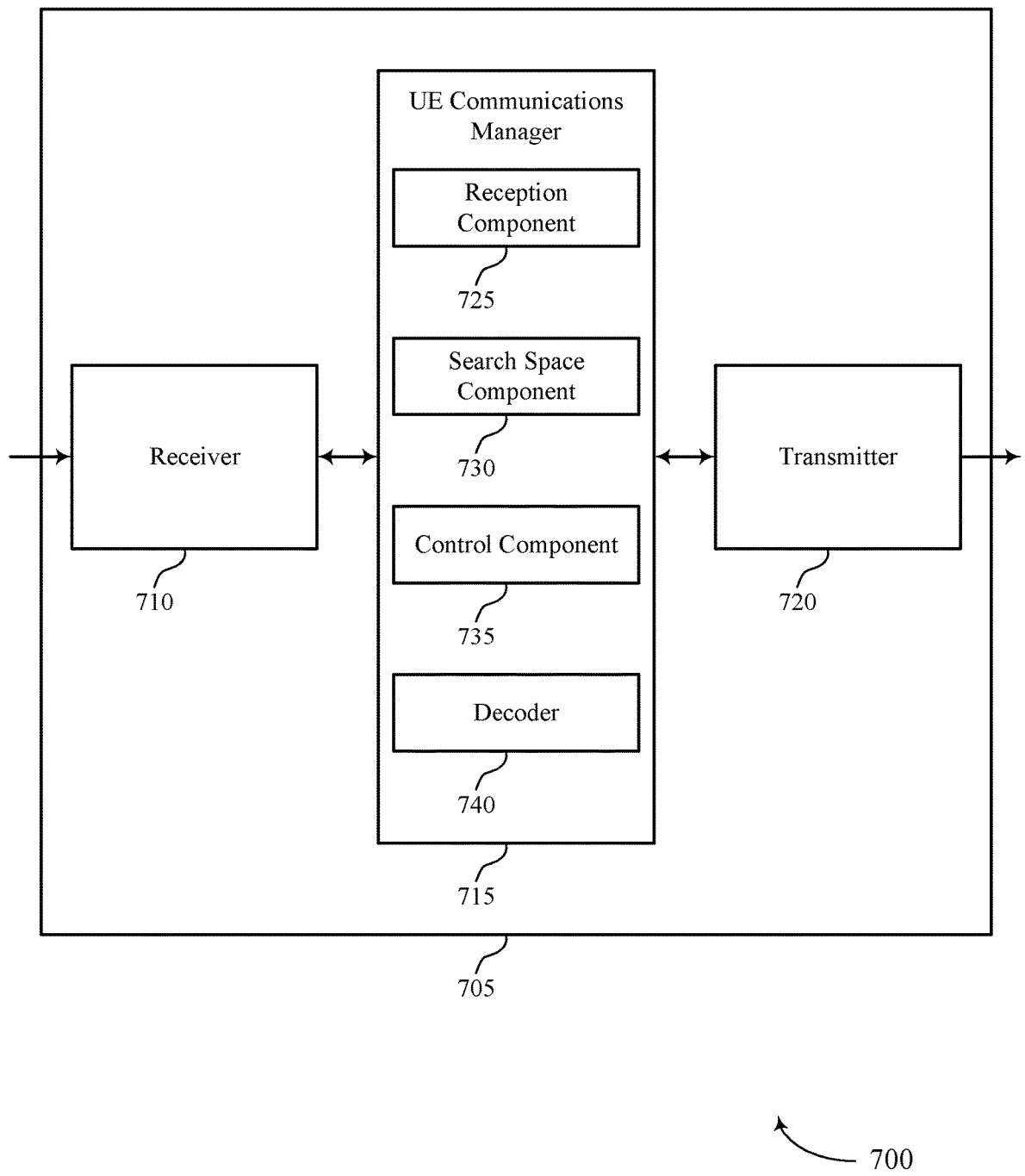

FIG. 7 shows a block diagram 700 of a wireless device 705 that supports common search space design for coverage enhancement in wireless communications in accordance with aspects of the present disclosure. Wireless device 705 may be an example of aspects of a wireless device 605 or a UE 115 as described with reference to FIG. 6. Wireless device 705 may include receiver 710, UE communications manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to common search space design for coverage enhancement in wireless communications, etc.). Information may be passed on to other components of the device. The receiver 710 may be an example of aspects of the transceiver 935 described with reference to FIG. 9. The receiver 710 may utilize a single antenna or a set of antennas.

UE communications manager 715 may be an example of aspects of the UE communications manager 915 described with reference to FIG. 9.

UE communications manager 715 may also include reception component 725, search space component 730, control component 735, and decoder 740.

Reception component 725 may receive, from a base station 105, a MIB. In some cases, receiving the MIB includes receiving a set of bits corresponding to the MIB, where the common search space is determined based on the set of bits. In some cases, at least a portion of the set of bits indicates a size of the common search space, a transmission mode of an ePDCCH, or a combination thereof. In some cases, the transmission mode of the ePDCCH includes one of a distributed transmission mode or a localized transmission mode.

Search space component 730 may determine, based on the MIB, a common search space for a PDCCH and identify a second common search space that overlaps the determined common search space. In some cases, the second common search space is associated with type-1 DCI and the determined common search space is associated with type-0 DCI.

Control component 735 may monitor a set of control channel elements of the common search space. In some cases, the set of control channel elements may be associated with a C-PDCCH. In some cases, the set of control channel elements is a fixed set. Decoder 740 may decode the C-PDCCH based on the monitored set of control channel elements and/or decode a SIB grant based on the monitored set of control channel elements, where the SIB grant is a SIB-MF1 grant. In some cases, identifying the second common search space includes decoding a SIB-MF1 grant based on the determined common search space.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
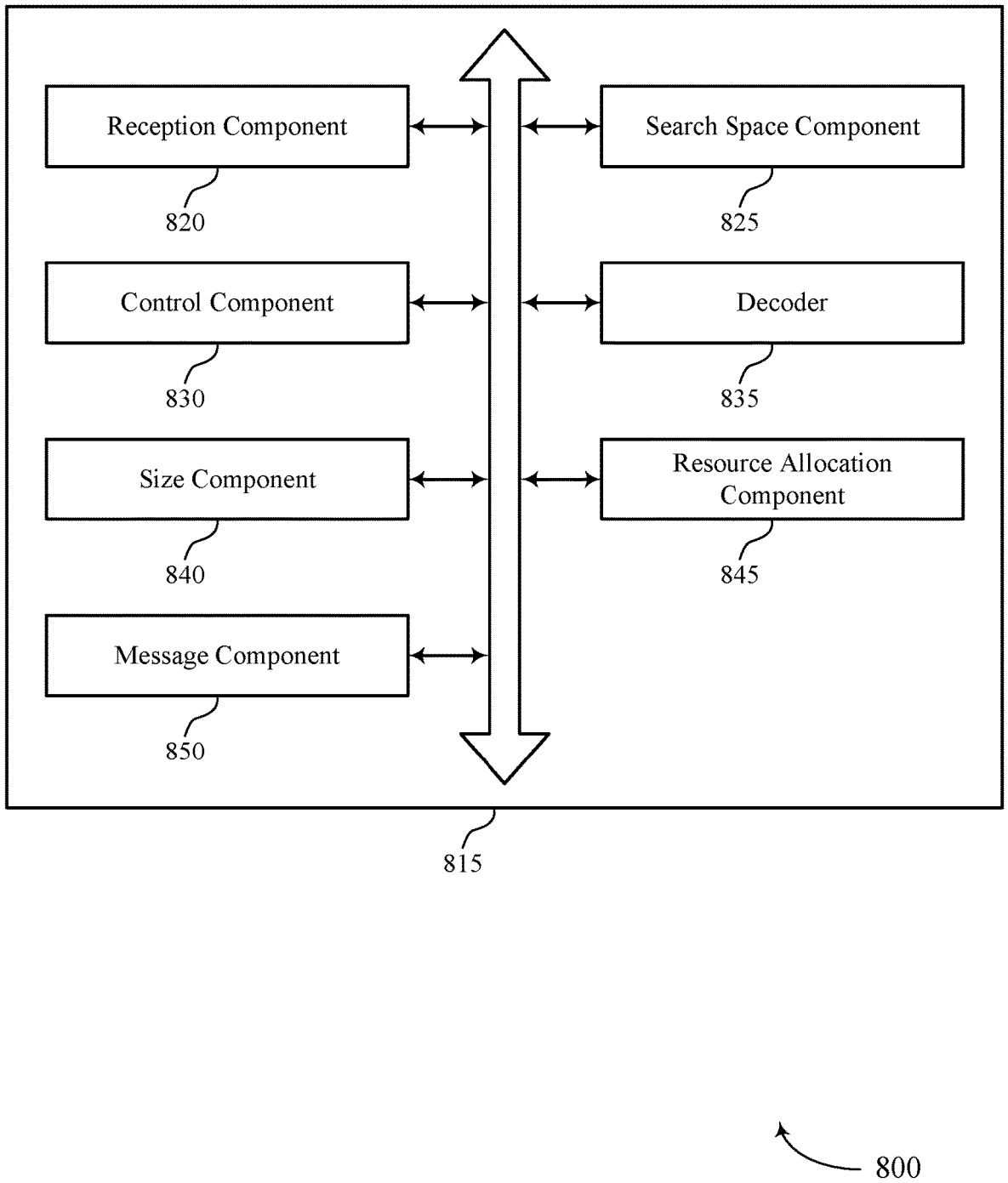

FIG. 8 shows a block diagram 800 of a UE communications manager 815 that supports common search space design for coverage enhancement in wireless communications in accordance with aspects of the present disclosure. The UE communications manager 815 may be an example of aspects of a UE communications manager 615, a UE communications manager 715, or a UE communications manager 915 described with reference to FIGS. 6, 7, and 9. The UE communications manager 815 may include reception component 820, search space component 825, control component 830, decoder 835, size component 840, resource allocation component 845, and message component 850. Each of these modules may communicate, directly or indirectly, with one another (e.g., via one or more buses).

Reception component 820 may receive, from a base station 105, a MIB. In some cases, receiving the MIB includes receiving a set of bits corresponding to the MIB, where the common search space is determined based on the set of bits. In some cases, at least a portion of the set of bits indicates a size of the common search space, a transmission mode of an ePDCCH, or a combination thereof. In some cases, the transmission mode of the ePDCCH includes one of a distributed transmission mode or a localized transmission mode.

Search space component 825 may determine, based on the MIB, a common search space for a PDCCH and identify a second common search space that overlaps the determined common search space. In some cases, the second common search space is associated with type-1 DCI and the determined common search space is associated with type-0 DCI.

Control component 830 may monitor a set of control channel elements of the common search space. In some cases, the set of control channel elements may be associated with a C-PDCCH. In some cases, the set of control channel elements is a fixed set.

Decoder 835 may decode the C-PDCCH based on the monitored set of control channel elements and/or decode a SIB grant based on the monitored set of control channel elements, where the SIB grant is a SIB-MF1 grant. In some cases, identifying the second common search space includes decoding a SIB-MF1 grant based on the determined common search space.

Size component 840 may determine (e.g., based on the size of the common search space) a channel for the C-PDCCH, a resource allocation for the C-PDCCH, a location of a SIB-MF1 grant, or a combination thereof. In some cases, the location of the SIB-MF1 grant may be determined based on the set of bits received by reception component 820.

Resource allocation component 845 may determine a resource allocation of the second common search space based on a SIB-MF1 payload scheduled by the decoded SIB-MF1 grant.

Message component 850 may receive a SIB, a random access message, a paging message, a TPC message, or a combination thereof based on the common search space.

Figure 9:
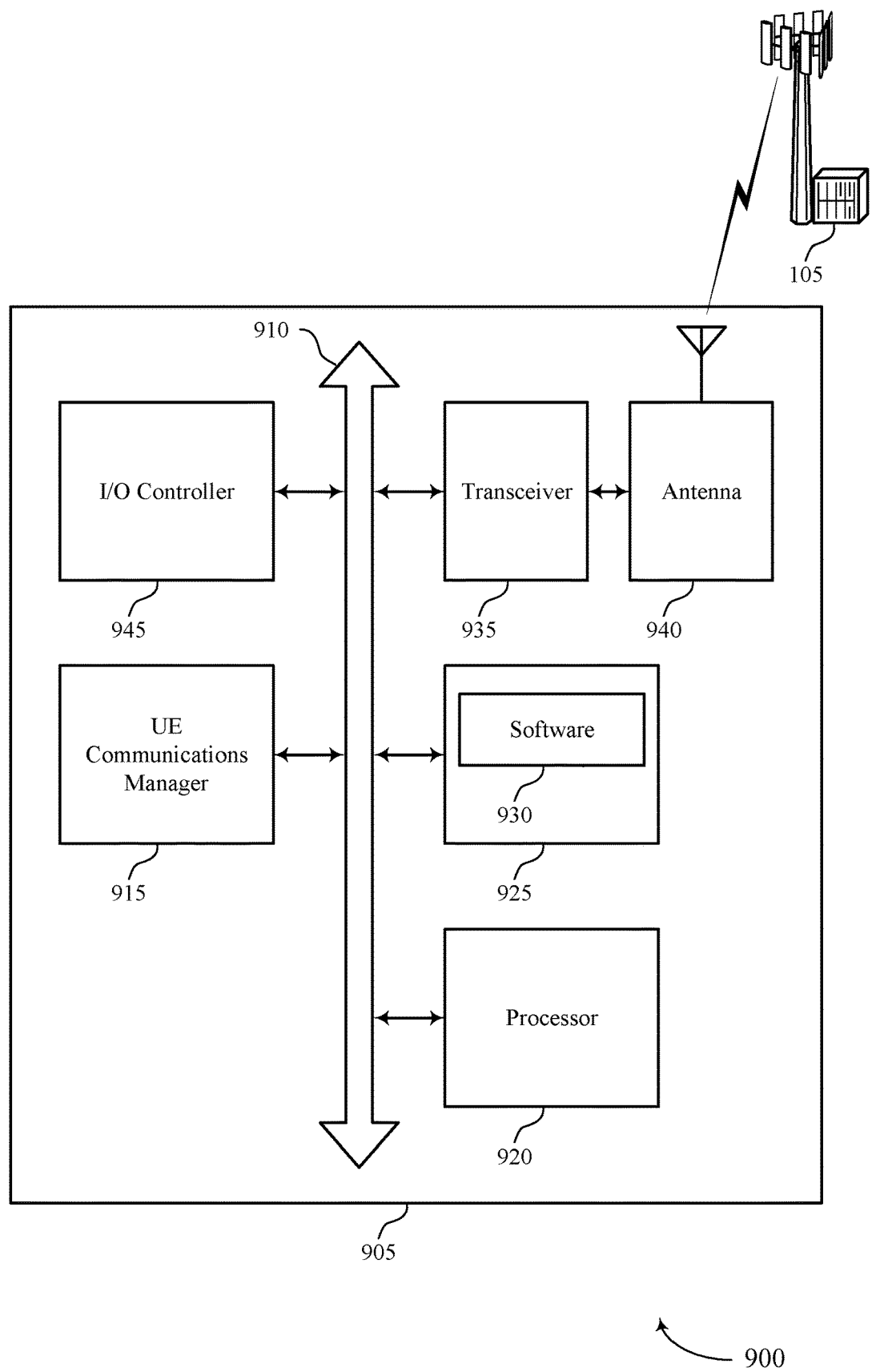
FIG. 9 illustrates a block diagram of a system including a user equipment (UE) that supports common search space design for coverage enhancement in wireless communications in accordance with aspects of the present disclosure.

FIG. 9 shows a diagram of a system 900 including a device 905 that supports common search space design for coverage enhancement in wireless communications in accordance with aspects of the present disclosure. Device 905 may be an example of or include the components of wireless device 605, wireless device 705, or a UE 115 as described above, e.g., with reference to FIGS. 6 and 7. Device 905 may include components for bi-directional voice and data communications including components for transmitting and receiving communications, including UE communications manager 915, processor 920, memory 925, software 930, transceiver 935, antenna 940, and I/O controller 945. These components may be in electronic communication via one or more buses (e.g., bus 910). Device 905 may communicate wirelessly with one or more base stations 105.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting common search space design for coverage enhancement in wireless communications).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support common search space design for coverage enhancement in wireless communications. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

I/O controller 945 may manage input and output signals for device 905. I/O controller 945 may also manage peripherals not integrated into device 905. In some cases, I/O controller 945 may represent a physical connection or port to an external peripheral. In some cases, I/O controller 945 may utilize an operating system such as iOS®, ANDROID®, MS-DOS®, MS-WINDOWS®, OS/2®, UNIX®, LINUX®, or another known operating system. In other cases, I/O controller 945 may represent or interact with a modem, a keyboard, a mouse, a touchscreen, or a similar device. In some cases, I/O controller 945 may be implemented as part of a processor. In some cases, a user may interact with device 905 via I/O controller 945 or via hardware components controlled by I/O controller 945.

Figure 10:
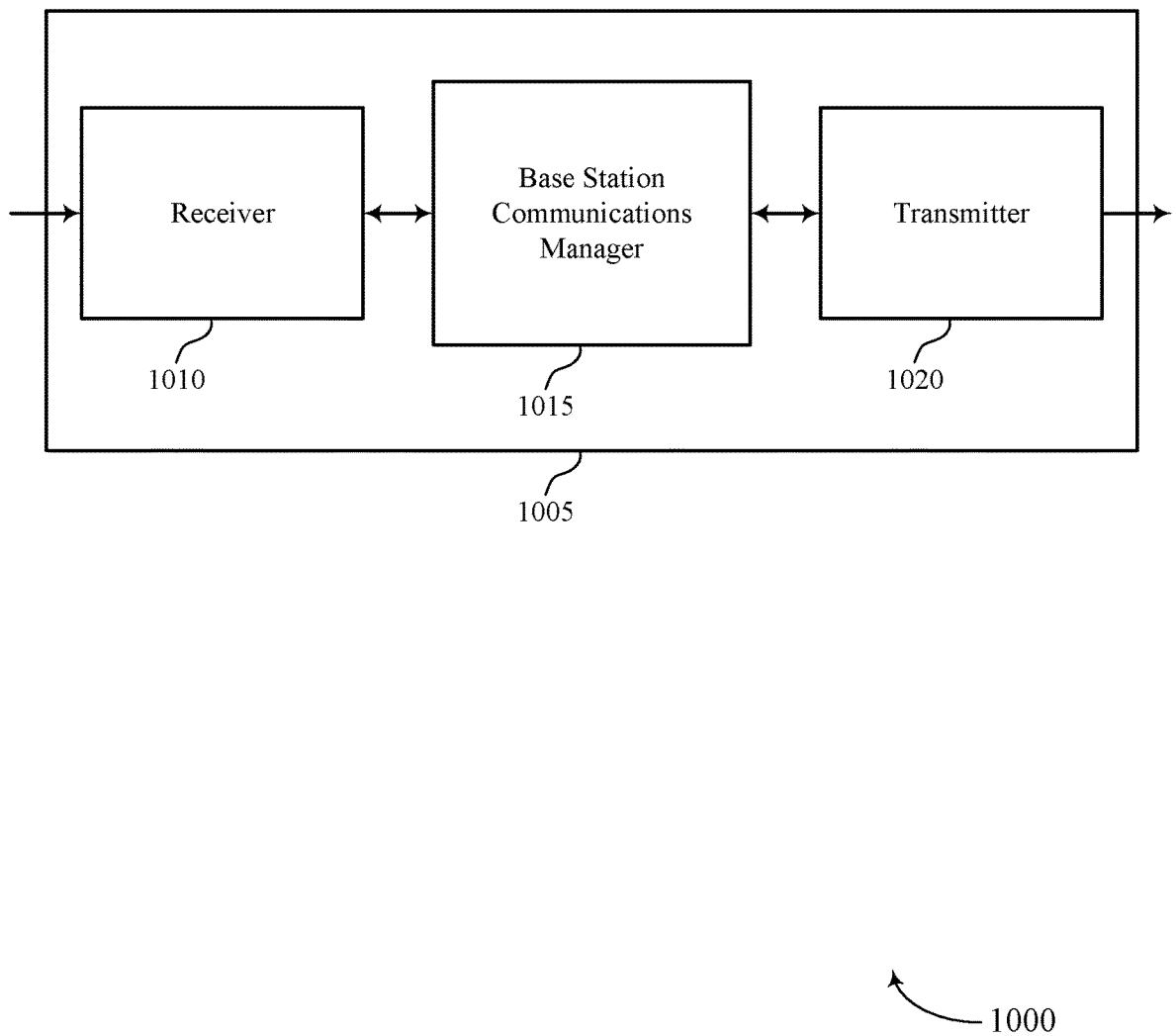
FIGS. 10 through 12 show block diagrams of a device that supports common search space design for coverage enhancement in wireless communications in accordance with aspects of the present disclosure.

FIG. 10 shows a block diagram 1000 of a wireless device 1005 that supports common search space design for coverage enhancement in wireless communications in accordance with aspects of the present disclosure. Wireless device 1005 may be an example of aspects of a base station 105 as described herein. Wireless device 1005 may include receiver 1010, base station communications manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to common search space design for coverage enhancement in wireless communications, etc.). Information may be passed on to other components of the device. The receiver 1010 may be an example of aspects of the transceiver 1335 described with reference to FIG. 13. The receiver 1010 may utilize a single antenna or a set of antennas.

Base station communications manager 1015 may be an example of aspects of the base station communications manager 1315 described with reference to FIG. 13.

Base station communications manager 1015 and/or at least some of its various sub-components may be implemented in hardware, software executed by a processor, firmware, or any combination thereof. If implemented in software executed by a processor, the functions of the base station communications manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The base station communications manager 1015 and/or at least some of its various sub-components may be physically located at various positions, including being distributed such that portions of functions are implemented at different physical locations by one or more physical devices. In some examples, base station communications manager 1015 and/or at least some of its various sub-components may be a separate and distinct component in accordance with various aspects of the present disclosure. In other examples, base station communications manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station communications manager 1015 may identify a common search space for an ePDCCH, allocate a first set of control channel elements within the common search space to a C-PDCCH, and transmit, to a UE 115, DCI over the allocated set of control channel elements.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1335 described with reference to FIG. 13. The transmitter 1020 may utilize a single antenna or a set of antennas.

Figure 11:
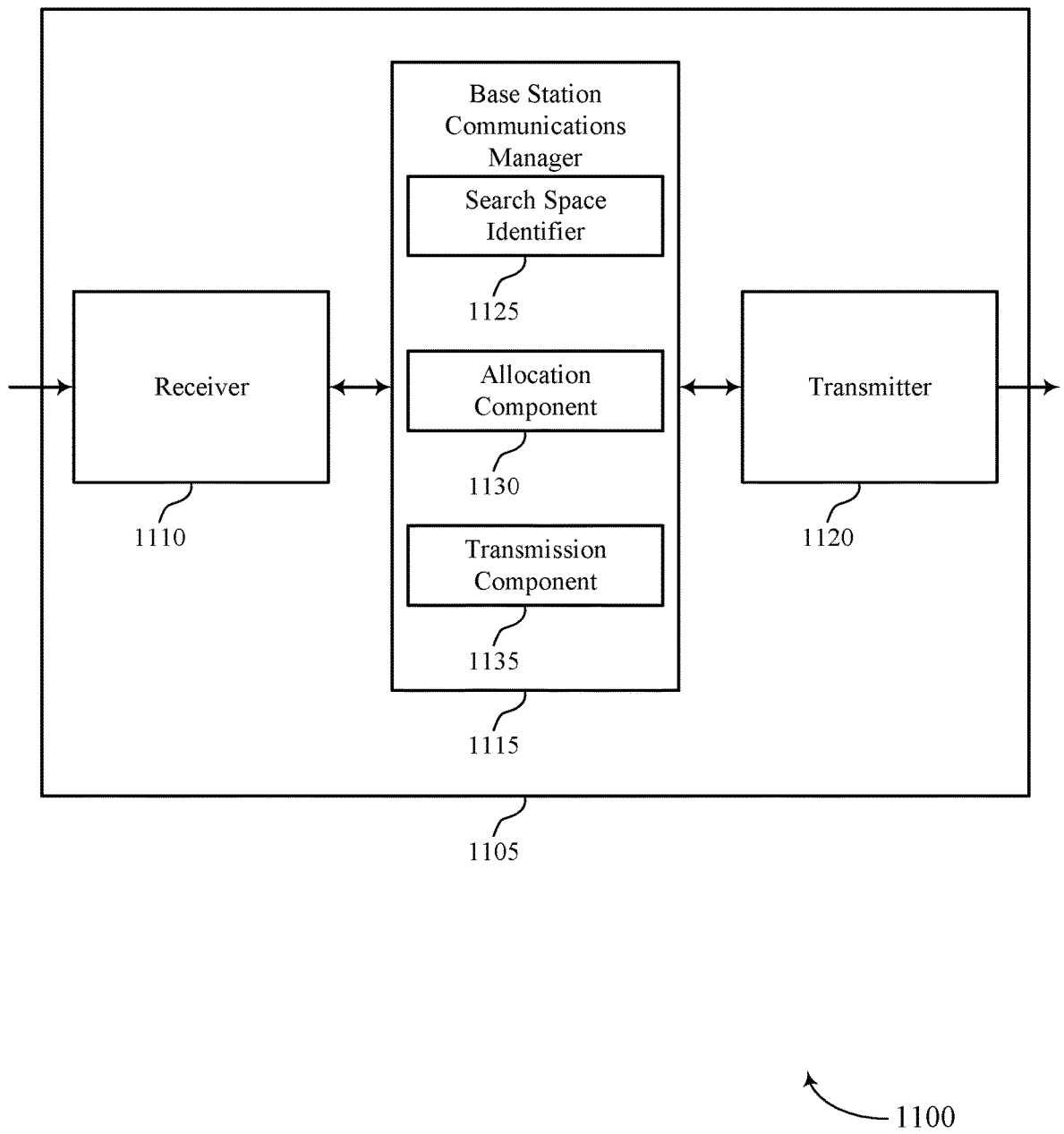

FIG. 11 shows a block diagram 1100 of a wireless device 1105 that supports common search space design for coverage enhancement in wireless communications in accordance with aspects of the present disclosure. Wireless device 1105 may be an example of aspects of a wireless device 1005 or a base station 105 as described with reference to FIG. 10. Wireless device 1105 may include receiver 1110, base station communications manager 1115, and transmitter 1120. Wireless device 1105 may also include a processor. Each of these components may be in communication with one another (e.g., via one or more buses).

Receiver 1110 may receive information such as packets, user data, or control information associated with various information channels (e.g., control channels, data channels, and information related to common search space design for coverage enhancement in wireless communications, etc.). Information may be passed on to other components of the device. The receiver 1110 may be an example of aspects of the transceiver 1335 described with reference to FIG. 13. The receiver 1110 may utilize a single antenna or a set of antennas.

Base station communications manager 1115 may be an example of aspects of the base station communications manager 1315 described with reference to FIG. 13.

Base station communications manager 1115 may also include search space identifier 1125, allocation component 1130, and transmission component 1135.

Search space identifier 1125 may identify a common search space for an ePDCCH and identify a second common search space overlapping with the identified common search space, where the second common search space is associated with type-1 DCI and the identified common search space is associated with type-0 DCI.

Allocation component 1130 may allocate a first set of control channel elements within the common search space to a C-PDCCH and allocate a second set of control elements within the common search space to a SIB, a SIB-MF1 grant, a random access message, a paging message, a TPC message, or a combination thereof.

Transmission component 1135 may transmit, to a UE 115, DCI over the allocated set of control channel elements.

Transmitter 1120 may transmit signals generated by other components of the device. In some examples, the transmitter 1120 may be collocated with a receiver 1110 in a transceiver module. For example, the transmitter 1120 may be an example of aspects of the transceiver 1335 described with reference to FIG. 13. The transmitter 1120 may utilize a single antenna or a set of antennas.

Figure 12:
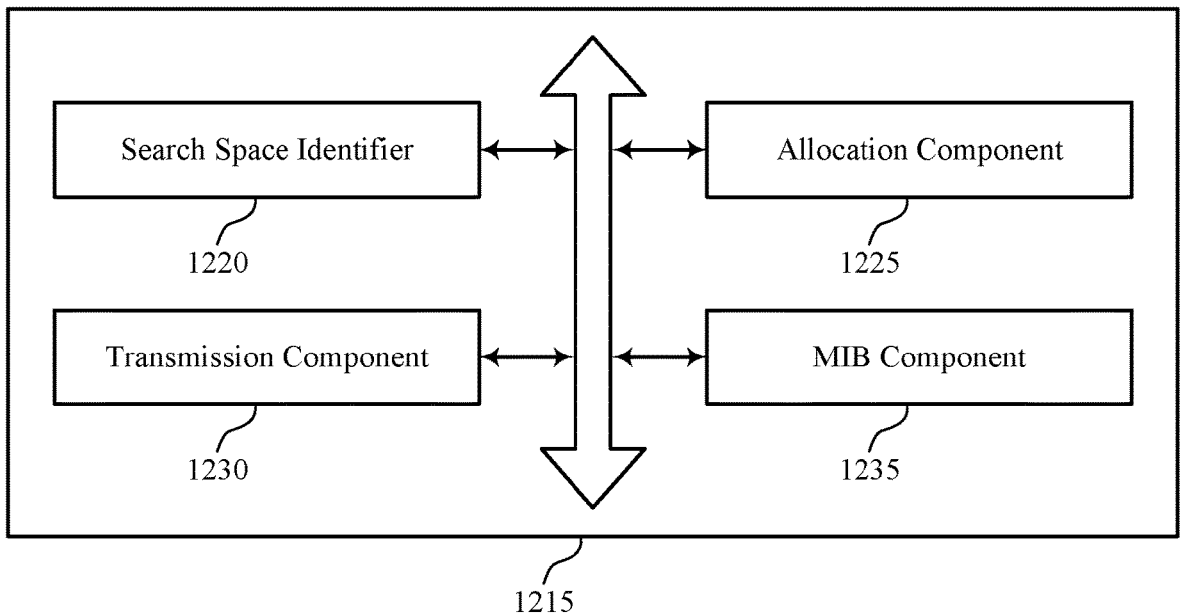

FIG. 12 shows a block diagram 1200 of a base station communications manager 1215 that supports common search space design for coverage enhancement in wireless communications in accordance with aspects of the present disclosure. The base station communications manager 1215 may be an example of aspects of a base station communications manager 1315 described with reference to FIGS. 10, 11, and 13. The base station communications manager 1215 may include search space identifier 1220, allocation component 1225, transmission component 1230, and MIB component 1235. Each of these modules may communicate, directly or indirectly, with one another (e.g., via one or more buses).

Search space identifier 1220 may identify a common search space for an ePDCCH and identify a second common search space overlapping with the identified common search space, where the second common search space is associated with type-1 DCI and the identified common search space is associated with type-0 DCI.

Allocation component 1225 may allocate a first set of control channel elements within the common search space to a C-PDCCH and allocate a second set of control elements within the common search space to a SIB, a SIB-MF1 grant, a random access message, a paging message, a TPC message, or a combination thereof.

Transmission component 1230 may transmit, to a UE 115, DCI over the allocated set of control channel elements.

MIB component 1235 may transmit a MIB that indicates information for the C-PDCCH, a SIB-MF1 grant, a transmission mode of the ePDCCH, or a combination thereof. In some cases, a set of bits of the MIB indicate a size of the common search space and/or a transmission mode of the.

Figure 13:
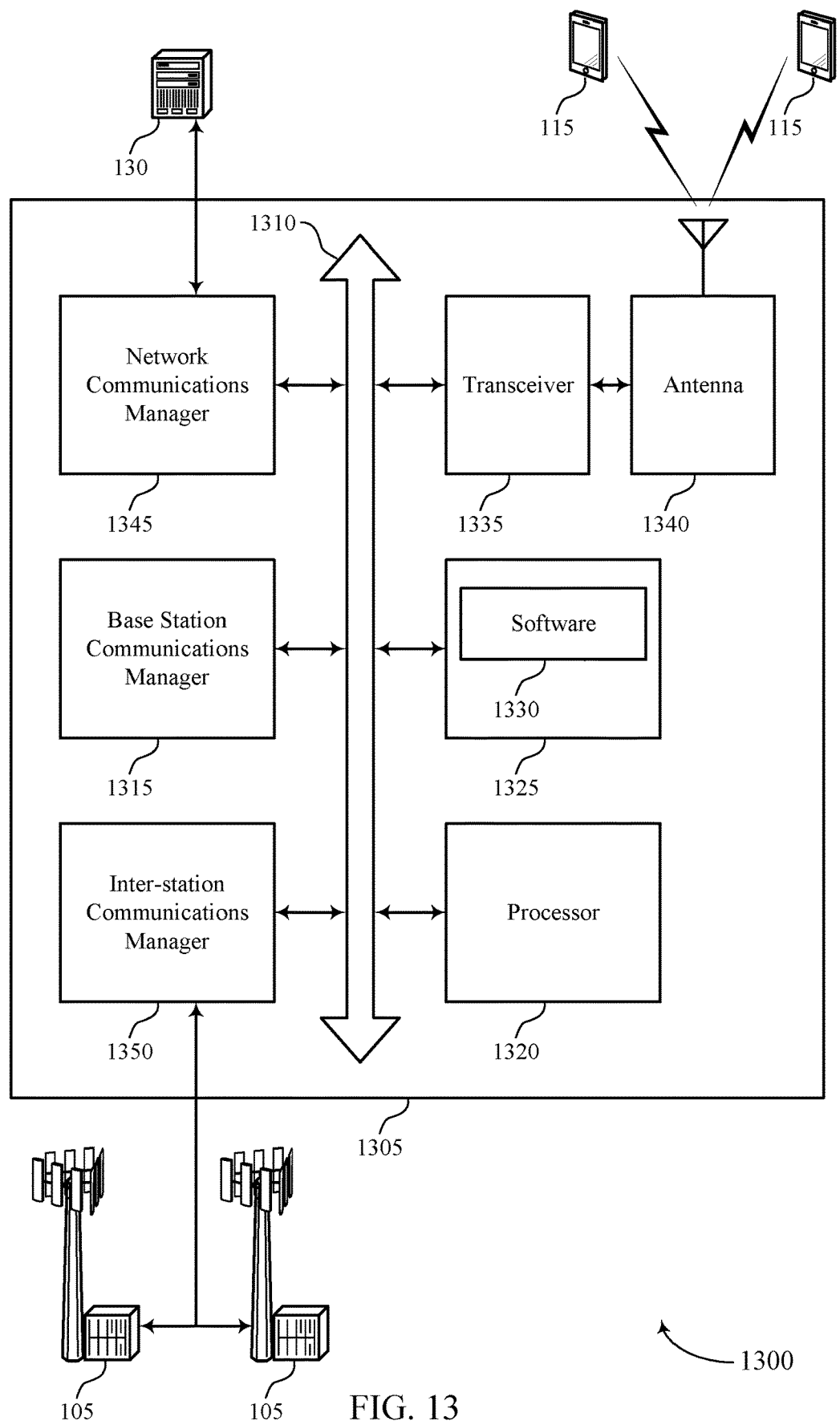
FIG. 13 illustrates a block diagram of a system including a base station that supports common search space design for coverage enhancement in wireless communications in accordance with aspects of the present disclosure.

FIG. 13 shows a diagram of a system 1300 including a device 1305 that supports common search space design for coverage enhancement in wireless communications in accordance with aspects of the present disclosure. Device 1305 may be an example of or include the components of base station 105 as described above, e.g., with reference to FIG. 1. Device 1305 may include components for bi-directional voice and data communications including components for transmitting and receiving communications, including base station communications manager 1315, processor 1320, memory 1325, software 1330, transceiver 1335, antenna 1340, network communications manager 1345, and inter-station communications manager 1350. These components may be in electronic communication via one or more buses (e.g., bus 1310). Device 1305 may communicate wirelessly with one or more UEs 115.

Processor 1320 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1320 may be configured to operate a memory array using a memory controller. In other cases, a memory controller may be integrated into processor 1320. Processor 1320 may be configured to execute computer-readable instructions stored in a memory to perform various functions (e.g., functions or tasks supporting common search space design for coverage enhancement in wireless communications).

Memory 1325 may include RAM and ROM. The memory 1325 may store computer-readable, computer-executable software 1330 including instructions that, when executed, cause the processor to perform various functions described herein. In some cases, the memory 1325 may contain, among other things, a BIOS which may control basic hardware or software operation such as the interaction with peripheral components or devices.

Software 1330 may include code to implement aspects of the present disclosure, including code to support common search space design for coverage enhancement in wireless communications. Software 1330 may be stored in a non-transitory computer-readable medium such as system memory or other memory. In some cases, the software 1330 may not be directly executable by the processor but may cause a computer (e.g., when compiled and executed) to perform functions described herein.

Transceiver 1335 may communicate bi-directionally, via one or more antennas, wired, or wireless links as described above. For example, the transceiver 1335 may represent a wireless transceiver and may communicate bi-directionally with another wireless transceiver. The transceiver 1335 may also include a modem to modulate the packets and provide the modulated packets to the antennas for transmission, and to demodulate packets received from the antennas.

In some cases, the wireless device may include a single antenna 1340. However, in some cases the device may have more than one antenna 1340, which may be capable of concurrently transmitting or receiving multiple wireless transmissions.

Network communications manager 1345 may manage communications with the core network (e.g., via one or more wired backhaul links). For example, the network communications manager 1345 may manage the transfer of data communications for client devices, such as one or more UEs 115.

Inter-station communications manager 1350 may manage communications with other base station 105 and may include a controller or scheduler for controlling communications with UEs 115 in cooperation with other base stations 105. For example, the inter-station communications manager 1350 may coordinate scheduling for transmissions to UEs 115 for various interference mitigation techniques such as beamforming or joint transmission. In some examples, inter-station communications manager 1350 may provide an X2 interface within an LTE/LTE-A wireless communication network technology to provide communication between base stations 105.

Figure 14:
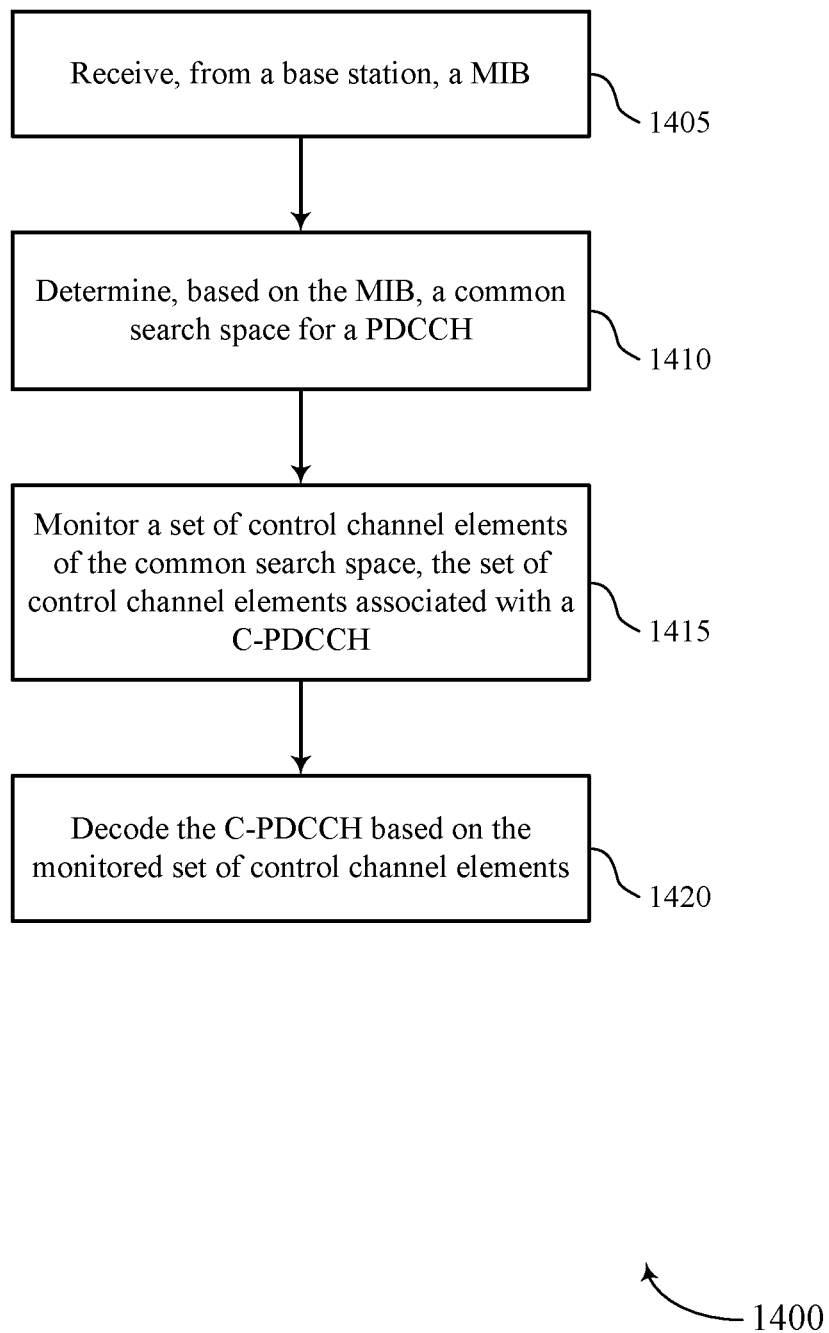
FIGS. 14 and 15 illustrate methods for common search space design for coverage enhancement in wireless communications in accordance with aspects of the present disclosure.

FIG. 14 shows a flowchart illustrating a method 1400 for common search space design for coverage enhancement in wireless communications in accordance with aspects of the present disclosure. The operations of method 1400 may be implemented by a UE 115 or its components as described herein. For example, the operations of method 1400 may be performed by a UE communications manager as described with reference to FIGS. 6 through 9. In some examples, a UE 115 may execute a set of codes to control the functional elements of the device to perform the functions described below. Additionally or alternatively, the UE 115 may perform aspects of the functions described below using special-purpose hardware.

At 1405 the UE 115 may receive, from a base station 105, a MIB. The operations of 1405 may be performed according to the methods described herein. In certain examples, aspects of the operations of 1405 may be performed by a reception component as described with reference to FIGS. 6 through 9.

At 1410 the UE 115 may determine, based on the MIB, a common search space for a PDCCH. The operations of 1410 may be performed according to the methods described herein. In certain examples, aspects of the operations of 1410 may be performed by a search space component as described with reference to FIGS. 6 through 9.

At 1415 the UE 115 may monitor a set of control channel elements of the common search space. In some cases, the set of control channel elements may be associated with a C-PDCCH. The operations of 1415 may be performed according to the methods described herein. In certain examples, aspects of the operations of 1415 may be performed by a control component as described with reference to FIGS. 6 through 9.

At 1420 the UE 115 may decode a SIB grant (e.g., a SIB-MF1 grant) based on the monitored set of control channel elements. The UE 115 may decode the C-PDCCH based on the monitored set of control channel elements. The operations of 1420 may be performed according to the methods described herein. In certain examples, aspects of the operations of 1420 may be performed by a decoder as described with reference to FIGS. 6 through 9.

Figure 15:
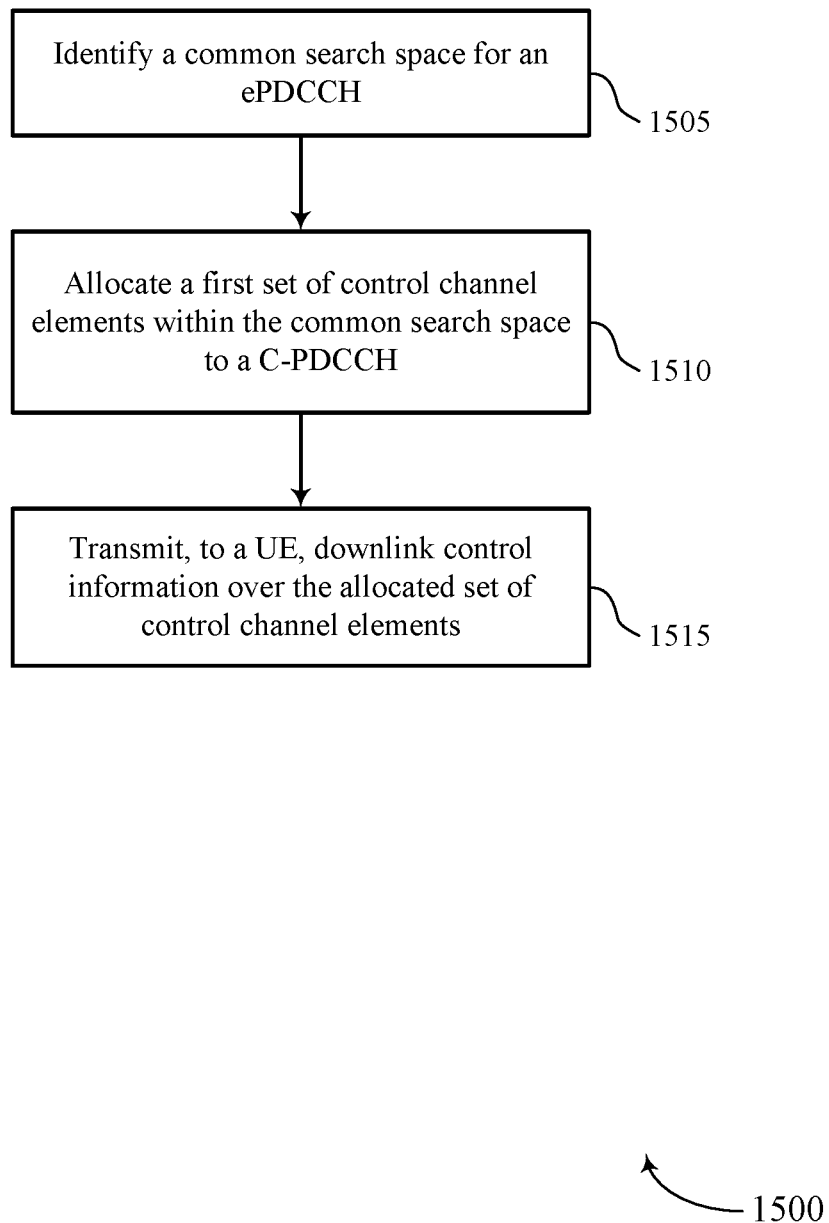

FIG. 15 shows a flowchart illustrating a method 1500 for common search space design for coverage enhancement in wireless communications in accordance with aspects of the present disclosure. The operations of method 1500 may be implemented by a base station 105 or its components as described herein. For example, the operations of method 1500 may be performed by a base station communications manager as described with reference to FIGS. 10 through 13. In some examples, a base station 105 may execute a set of codes to control the functional elements of the device to perform the functions described below. Additionally or alternatively, the base station 105 may perform aspects of the functions described below using special-purpose hardware.

At 1505 the base station 105 may identify a common search space for an ePDCCH. The operations of 1505 may be performed according to the methods described herein. In certain examples, aspects of the operations of 1505 may be performed by a search space identifier as described with reference to FIGS. 10 through 13.

At 1510 the base station 105 may allocate a first set of control channel elements within the common search space to a C-PDCCH. The operations of 1510 may be performed according to the methods described herein. In certain examples, aspects of the operations of 1510 may be performed by a allocation component as described with reference to FIGS. 10 through 13.

At 1515 the base station 105 may transmit, to a UE 115, DCI over the allocated set of control channel elements. The operations of 1515 may be performed according to the methods described herein. In certain examples, aspects of the operations of 1515 may be performed by a transmission component as described with reference to FIGS. 10 through 13.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems 100 or 200 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication, comprising:
   receiving, from a base station, a master information block (MIB);
   determining, based at least in part on the MIB, a first common search space for a physical downlink control channel (PDCCH);
   monitoring a set of control channel elements of the first common search space;
   decoding a system information block (SIB) grant based at least in part on the monitored set of control channel elements, wherein the SIB grant is a Multefire SIB (SIB-MF1) grant; and
   determining a second common search space for performing Multefire communications based at least in part on the decoded Multefire SIB grant.

2. The method of claim 1, further comprising:
   decoding a common PDCCH (C-PDCCH) based at least in part on the monitored set of control channel elements.

3. The method of claim 1, wherein receiving the MIB comprises:
   receiving a set of bits corresponding to the MIB, wherein the first common search space is determined based at least in part on the set of bits.

4. The method of claim 3, wherein at least a portion of the set of bits indicates a transmission mode of an enhanced PDCCH (ePDCCH).

5. The method of claim 4, further comprising:
   determining a location of the SIB-MF1 grant based at least in part on the set of bits.

6. The method of claim 4, wherein the transmission mode of the ePDCCH comprises one of a distributed transmission mode or a localized transmission mode.

7. The method of claim 1, wherein the second common search space overlaps the determined first common search space.

8. The method of claim 7, wherein determining the second common search space comprises:
   decoding the SIB-MF1 grant based at least in part on the determined first common search space; and
   determining a resource allocation of the second common search space based at least in part on a SIB-MF1 payload scheduled by the decoded SIB-MF1 grant.

9. The method of claim 7, wherein the second common search space is associated with type-1 downlink control information (DCI) and the determined first common search space is associated with type-0 downlink control information (DCI).

10. The method of claim 1, further comprising:
    receiving a system information block (SIB), a random access message, a paging message, a transmit power control (TPC) message, or a combination thereof based at least in part on the first common search space.

11. The method of claim 1, wherein the set of control channel elements is a fixed set.

12. An apparatus for wireless communication, comprising:
    means for receiving, from a base station, a master information block (MIB);
    means for determining, based at least in part on the MIB, a first common search space for a physical downlink control channel (PDCCH);
    means for monitoring a set of control channel elements of the first common search space;
    means for decoding a system information block (SIB) grant based at least in part on the monitored set of control channel elements, wherein the SIB grant is a Multefire SIB (SIB-MF1) grant; and
    means for determining a second common search space for performing Multefire communications based at least in part on the decoded Multefire SIB grant.

13. The apparatus of claim 12, further comprising:
    means for decoding a common PDCCH (C-PDCCH) based at least in part on the monitored set of control channel elements.

14. The apparatus of claim 12, wherein the means for receiving the MIB comprises:
    means for receiving a set of bits corresponding to the MIB, wherein the first common search space is determined based at least in part on the set of bits.

15. The apparatus of claim 14, wherein at least a portion of the set of bits indicates a transmission mode of an enhanced PDCCH (ePDCCH).

16. The apparatus of claim 15, further comprising:
    means for determining a location of the SIB-MF1 grant based at least in part on the set of bits.

17. The apparatus of claim 15, wherein the transmission mode of the ePDCCH comprises one of a distributed transmission mode or a localized transmission mode.

18. The apparatus of claim 12, wherein the second common search space overlaps the determined first common search space.

19. The apparatus of claim 18, wherein the means for determining the second common search space comprises:
    means for decoding the SIB-MF1 grant based at least in part on the determined first common search space; and
    means for determining a resource allocation of the second common search space based at least in part on a SIB-MF1 payload scheduled by the decoded SIB-MF1 grant.

20. The apparatus of claim 18, wherein the second common search space is associated with type-1 downlink control information (DCI) and the determined first common search space is associated with type-0 downlink control information (DCI).

21. The apparatus of claim 12, further comprising:
    means for receiving a system information block (SIB), a random access message, a paging message, a transmit power control (TPC) message, or a combination thereof based at least in part on the first common search space.

22. The apparatus of claim 12, wherein the set of control channel elements is a fixed set.

23. An apparatus for wireless communication, comprising:
a processor;
memory in electronic communication with the processor; and
instructions stored in the memory and operable, when executed by the processor, to cause the apparatus to:
receive, from a base station, a master information block (MIB);
determine, based at least in part on the MIB, a first common search space for a physical downlink control channel (PDCCH);
monitor a set of control channel elements of the first common search space; and
decode a system information block (SIB) grant based at least in part on the monitored set of control channel elements, wherein the SIB grant is a Multefire SIB (SIB-MF1) grant; and
determine a second common search space for performing Multefire communications based at least in part on the decoded Multefire SIB grant.

24. The apparatus of claim 23, wherein the instructions are further executable by the processor to:
decode a common PDCCH (C-PDCCH) based at least in part on the monitored set of control channel elements.

25. The apparatus of claim 23, wherein the instructions executable by the processor to receive the MIB comprise further instructions executable by the processor to:
receive a set of bits corresponding to the MIB, wherein the first common search space is determined based at least in part on the set of bits.

26. The apparatus of claim 25, wherein at least a portion of the set of bits indicates a transmission mode of an enhanced PDCCH (ePDCCH).

27. The apparatus of claim 26, wherein the instructions are further executable by the processor to:
determine a location of the SIB-MF1 grant based at least in part on the set of bits.

28. The apparatus of claim 26, wherein the transmission mode of the ePDCCH comprises one of a distributed transmission mode or a localized transmission mode.

29. The apparatus of claim 23, wherein the second common search space overlaps the determined common search space.

30. The apparatus of claim 29, wherein the instructions executable by the processor to determine the second common search space comprise further instructions executable by the processor to:
decode the SIB-MF1 grant based at least in part on the determined first common search space; and
determine a resource allocation of the second common search space based at least in part on a SIB-MF1 payload scheduled by the decoded SIB-MF1 grant.

31. The apparatus of claim 29, wherein the second common search space is associated with type-1 downlink control information (DCI) and the determined first common search space is associated with type-0 downlink control information (DCI).

32. The apparatus of claim 23, wherein the instructions are further executable by the processor to:
receive a system information block (SIB), a random access message, a paging message, a transmit power control (TPC) message, or a combination thereof based at least in part on the first common search space.

33. The apparatus of claim 23, wherein the set of control channel elements is a fixed set.

34. A non-transitory computer readable medium storing code for wireless communication, the code comprising instructions executable by a processor to:
receive, from a base station, a master information block (MIB);
determine, based at least in part on the MIB, a first common search space for a physical downlink control channel (PDCCH);
monitor a set of control channel elements of the first common search space;
decode a system information block (SIB) grant based at least in part on the monitored set of control channel elements, wherein the SIB grant is a Multefire SIB (SIB-MF1) grant; and
determine a second common space for performing Multefire communications based at least in part on the decoded Multefire SIB grant.

35. The non-transitory computer-readable medium of claim 34, wherein the instructions are further executable by the processor to:
decode a common PDCCH (C-PDCCH) based at least in part on the monitored set of control channel elements.

36. The non-transitory computer-readable medium of claim 34, wherein the instructions executable by the processor to receive the MIB comprise further instructions executable by the processor to:
receive a set of bits corresponding to the MIB, wherein the first common search space is determined based at least in part on the set of bits.

37. The non-transitory computer-readable medium of claim 36, wherein, at least a portion of the set of bits indicates a transmission mode of an enhanced PDCCH (ePDCCH).

38. The non-transitory computer-readable medium of claim 37, wherein the instructions are further executable by the processor to:
determine a location of the SIB-MF1 grant based at least in part on the set of bits.

39. The non-transitory computer-readable medium of claim 37, wherein the transmission mode of the ePDCCH comprises one of a distributed transmission mode or a localized transmission mode.

40. The non-transitory computer-readable medium of claim 34, wherein the second common search space overlaps the determined common search space.

41. The non-transitory computer-readable medium of claim 40, wherein the instructions executable by the processor to determine the second common search space comprise further instructions executable by the processor to:
decode the SIB-MF1 grant based at least in part on the determined first common search space; and
determine a resource allocation of the second common search space based at least in part on a SIB-MF1 payload scheduled by the decoded SIB-MF1 grant.

42. The non-transitory computer-readable medium of claim 40, wherein the second common search space is associated with type-1 downlink control information (DCI) and the determined first common search space is associated with type-0 downlink control information (DCI).

43. The non-transitory computer-readable medium of claim 34, wherein the instructions are further executable by the processor to:
receive a system information block (SIB), a random access message, a paging message, a transmit power control (TPC) message, or a combination thereof based at least in part on the first common search space.

44. The non-transitory computer-readable medium of claim 34, wherein the set of control channel elements is a fixed set.

\* \* \* \* \*